United States Patent [19]
Arai et al.

[11] Patent Number: 6,052,536
[45] Date of Patent: Apr. 18, 2000

[54] CAMERA

[75] Inventors: Hiroyuki Arai; Makoto Akiba; Tatsuo Saito; Akio Omiya, all of Omiya; Hisashi Hamada; Tokuji Sato, both of Asaka, all of Japan

[73] Assignees: Fuji Photo Film Co., Ltd., Kanagawa; Fuji Photo Optical Co., Ltd., Saitama, both of Japan

[21] Appl. No.: 09/249,778

[22] Filed: Feb. 16, 1999

[30] Foreign Application Priority Data

Feb. 16, 1998 [JP] Japan .................................. 10-033419

[51] Int. Cl.⁷ .................................................. G03B 17/24
[52] U.S. Cl. ...................... 396/100; 396/233; 396/268; 396/275; 396/448
[58] Field of Search ...................... 396/268, 275, 396/448, 233, 100

[56] References Cited

U.S. PATENT DOCUMENTS 5,666,568  9/1997  Saito et al. .............................. 396/448

FOREIGN PATENT DOCUMENTS 60-98973  7/1985  Japan .............................. H04N 5/225
9-105974  4/1997  Japan .............................. G03B 7/08

*Primary Examiner*—David M. Gray
*Attorney, Agent, or Firm*—Sughrue, Mion, Zinn, Macpeak & Seas, PLLC

[57] ABSTRACT

In a camera wherein a lens cap is detachably attached there are provided first and second photometric sensors on a lens barrel and the camera main frame, respectively. It is detected in accordance with the photometric values by the first and second photometric sensors whether the lens cap is mounted. According to the camera, it is possible to detect with great accuracy whether the lens cap is mounted, with a standard type lens cap.

4 Claims, 36 Drawing Sheets

Fig.36

| 1/L | EXTENSION COUNT NUMBERS | | | | DISTANCE [m] |
|---|---|---|---|---|---|
| | ZOOM POSITION=Z1 | ZOOM POSITION=Z2 | ZOOM POSITION=Z3 | ZOOM POSITION=Z4 | |
| 1001 | 1306 | 1366 | 1431 | 1440 | 0.9990 |
| 982 | 1287 | 1347 | 1411 | 1420 | 1.0183 |
| 944 | 1249 | 1309 | 1372 | 1380 | 1.0595 |
| 905 | 1212 | 1270 | 1333 | 1340 | 1.1046 |
| 866 | 1174 | 1232 | 1294 | 1301 | 1.1542 |
| 827 | 1136 | 1194 | 1256 | 1261 | 1.2090 |
| | | | | | |
| 194 | 568 | 624 | 680 | 680 | 5.1654 |
| 148 | 531 | 586 | 642 | 642 | 6.7484 |
| 102 | 493 | 548 | 604 | 604 | 9.7709 |
| 56 | 455 | 510 | 566 | 566 | 17.8322 |
| 9 | 418 | 473 | 529 | 529 | 106.6242 |
| (INF)0 | 410 | 465 | 521 | 521 | ∞ |

| CORRECTION DATA FOR 220 | CORRECTION VALUES FOR EXTENSION COUNT NUMBERS | | | |
|---|---|---|---|---|
| | ZOOM POSITION=Z1 | ZOOM POSITION=Z2 | ZOOM POSITION=Z3 | ZOOM POSITION=Z4 |
| | -3 | -5 | -7 | -10 |

| MF SET UP DISTANCE | 1/L |
|---|---|
| InF | 0 |
| 20m | 50 |
| 10m | 100 |
| 7.0m | 142 |
| | 200 |
| 1.2m | 833 |
| 1.1m | 909 |
| 1.0m | 1000 |

CAMERA

BACKGROUND OF THE INVENTION

1. Field of the Invention

The present invention relates to a camera in which a lens cap is detachably mounted.

2. Description of the Related Art

Hitherto, for the purpose of protection of a photographic lens and prevention of dirt, when a camera is not used, a lens cap is mounted on the front of the camera.

In case of a camera having a detachable lens cap and in addition a finder as well as a photographic lens, it is impossible through the finder to confirm as to whether the lens cap is mounted. Thus, there is a possibility that the photographic operation is performed while the lens cap is attached and thus an operational error will occur.

In order to prevent such an operational error, it is considered that a camera is provided with a lens cap which covers a photographic lens and a finder as well. However, in this case, there is a need to cover the finder located apart from the photographic lens. Thus, it is necessary to provide a large size and unusual configuration of lens cap. A large size of lens cap is inconvenient in treatment, and a unusual configuration of lens cap brings about a problem in design.

Japanese Patent application Laid-Open Gazette No. Hei.9-105974 discloses such a technology that a lens cap for covering an optical system for focusing is provided together with a photographic lens, and it is determined as to whether the lens cap is mounted in accordance with a luminance level measured by a photo-electric element, or a photocell for focussing and a luminance level measured by a photo-electric element, or a photocell for focussing, which is not covered by the lens cap, and an alarm is generated. However, it is necessary also for the lens cap disclosed in Japanese Patent application Laid-Open Gazette No. Hei.9-105974 to cover the optical system for focusing as well as the photographic lens. Thus, it is necessary to prepare a large size and unusual configuration of lens cap. Accordingly, this technology is also associated with the problem of inconvenience on a treatment of the lens cap and the problem on a design.

Further, Japanese Utility Model Application Laid-open Gazette No. Sho.60-98973 discloses a technique for detecting a lens cap by a switch. In case of detecting the lens cap by a switch, however, a specific shape of lens cap has to be used to detect the lens cap in order that when the lens cap is attached, the switch is reliably operated. In the event that a photographic filter is attached to the front of a lens barrel, some structure of the switch is associated with such a fear that the photographic filter is erroneously detected as the lens cap.

Japanese Patent application Laid-Open Gazette No. Hei.2-247627 also discloses a technology for detecting a lens cap by a switch. However, Japanese Patent application Laid-Open Gazette No. Hei.2-247627 fails to disclose the use of a detection unit, and it is considered that such a technology is associated with a fault similar to that of Japanese Utility Model Application Laid-open Gazette No. Sho.60-98973.

In order to prevent an error of a photography, it is considered that a camera incorporates thereinto a lens cap which opens in accordance with an operation always necessary for the photography, for instance, an operation for turning on the power switch. However, in some structure of the photographic lens, it often happens that it is difficult to incorporate thereinto such a lens cap.

SUMMARY OF THE INVENTION

In view of the foregoing, it is an object of the present invention to provide a camera capable of using a standard type of lens cap and having a function of detecting as to whether the lens cap is attached with great accuracy.

In order to attain the above-mentioned object of the present invention, there is provided a camera comprising:

a lens barrel incorporating a photographic lens, on which a lens cap for covering a front of the photographic lens is detachably mounted, said lens barrel having a first sensor for photometry at a position of an outside of the photographic lens, which is covered by the lens cap;

a second sensor for exposure control provided on a camera main frame independent of said lens barrel; and a determining unit for determining whether the lens cap is mounted on said lens barrel in accordance with a first photometric value by said first sensor and a second photometric value by said second sensor.

In the camera as mentioned above, it is preferable that said lens barrel has a filter ring having an outer wall on which the lens cap is detachably mounted and an inner wall on which a photographic filter is detachably mounted, and said lens barrel has said first sensor at a position inside said filter ring and outside the photographic lens.

In the camera as mentioned above, it is preferable that said lens barrel incorporates thereinto a shutter having a sector and a shutter drive unit for driving said sector;

the camera main frame has a shutter control unit for outputting a shutter drive control signal to said shutter drive unit; and said camera has a flexible substrate for electrically connecting said shutter control unit to said shutter drive unit and for transmitting the first photometric value by said first sensor to said determining unit.

In the camera as mentioned above, it is preferable that said determining unit determines an attachment of the lens cap when following relations are satisfied, $LVa <$ the photometric value, and $LVb >$ the second photometric value where LVa denotes a first threshold to be compared with the first photometric value by said first sensor, and LVb denotes a second threshold to be compared with the second photometric value by said second sensor (assuming that $Lva < LVb$).

BRIEF DESCRIPTION OF THE DRAWINGS

FIG. 36 is a view showing a part of a table showing the association between a photographic distance or a camera-to-subject distance and an amount of lens extension;

DESCRIPTION OF THE PREFERRED EMBODIMENTS

Hereinafter there will be described embodiments of the present invention.

Figure 1:
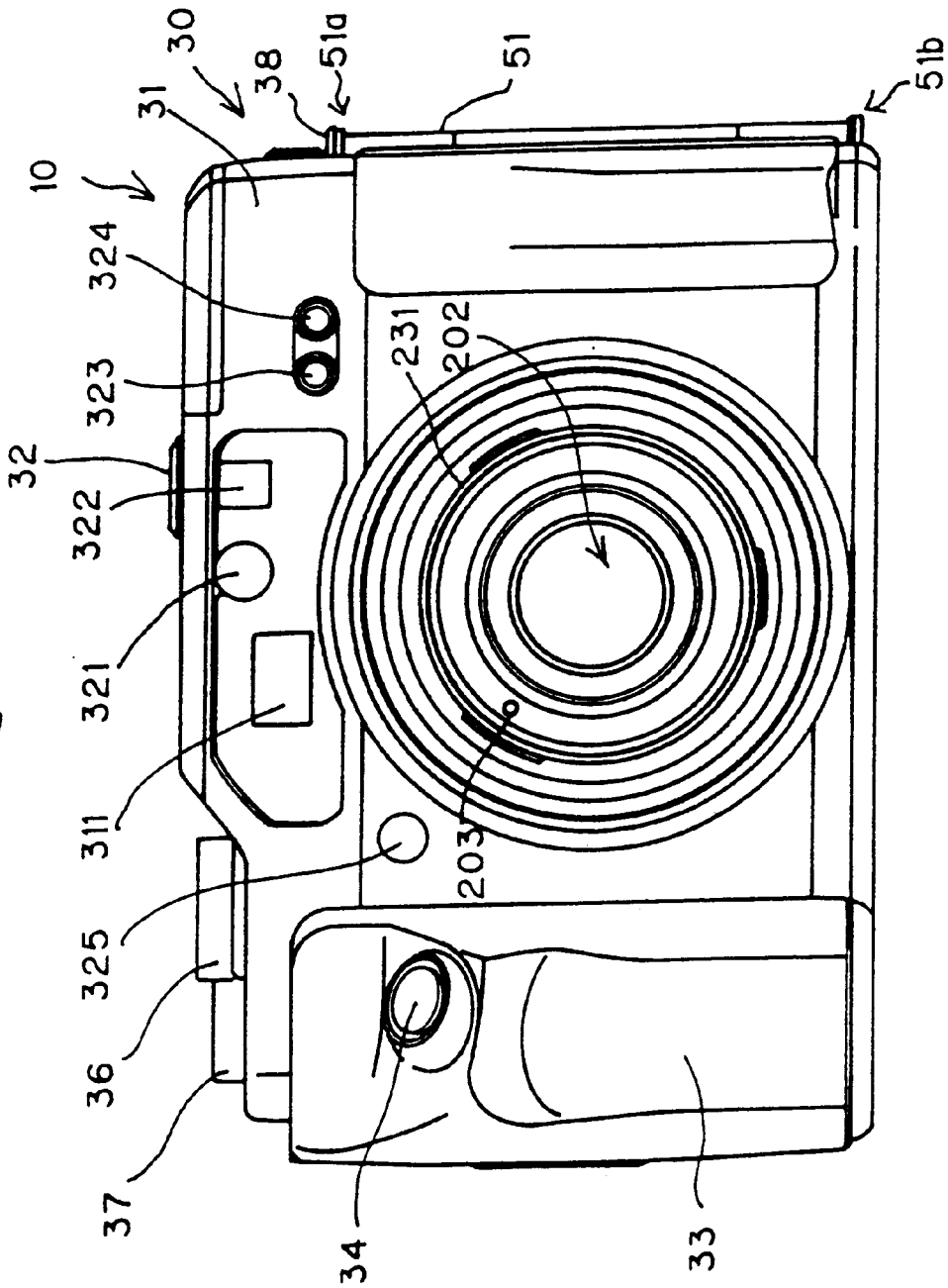
FIG. 1 is a front elevation of a camera according to an embodiment of the present invention.
Figure 2:
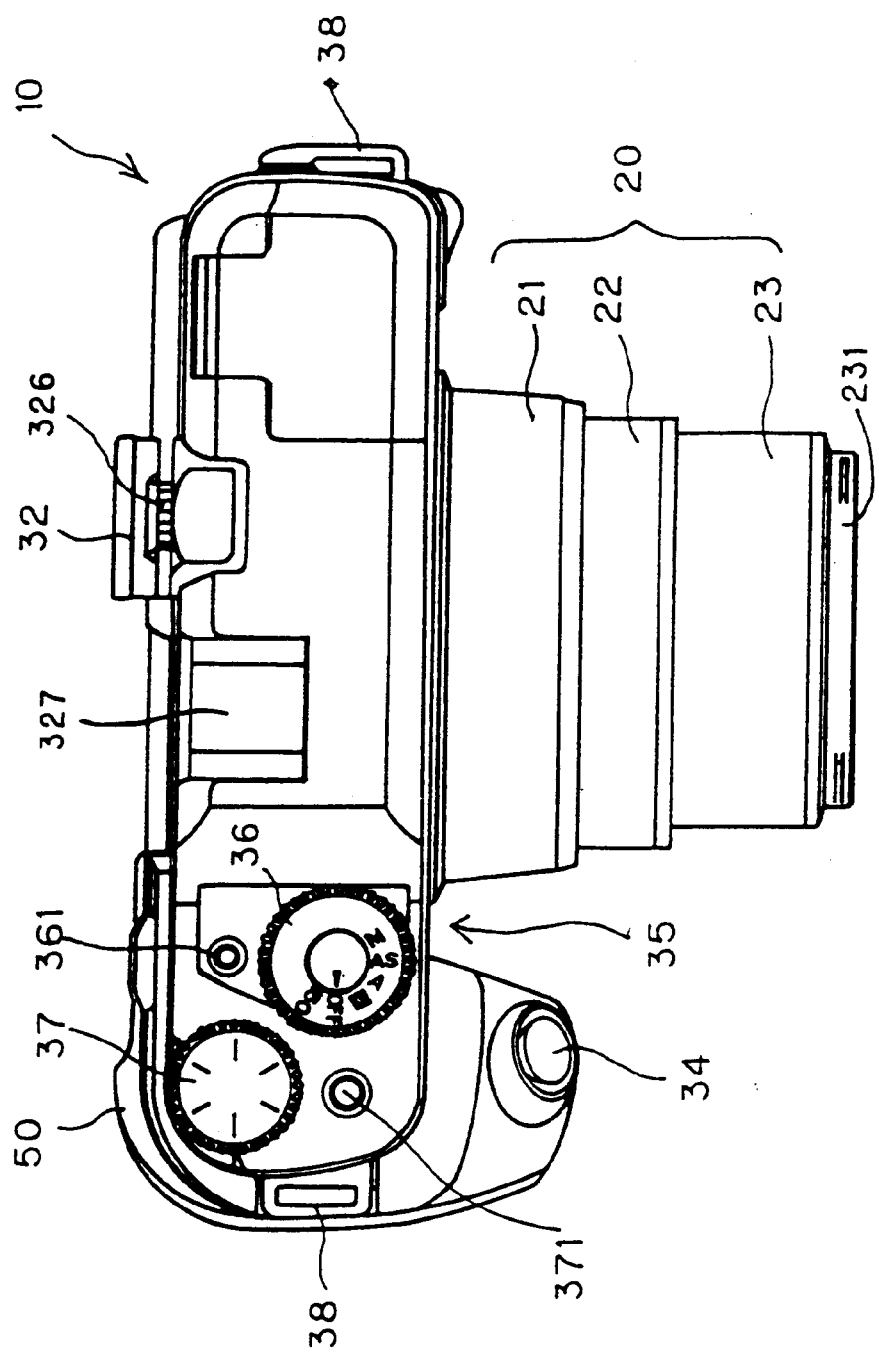
FIG. 2 is a plan view of a camera according to an embodiment of the present invention.
Figure 3:
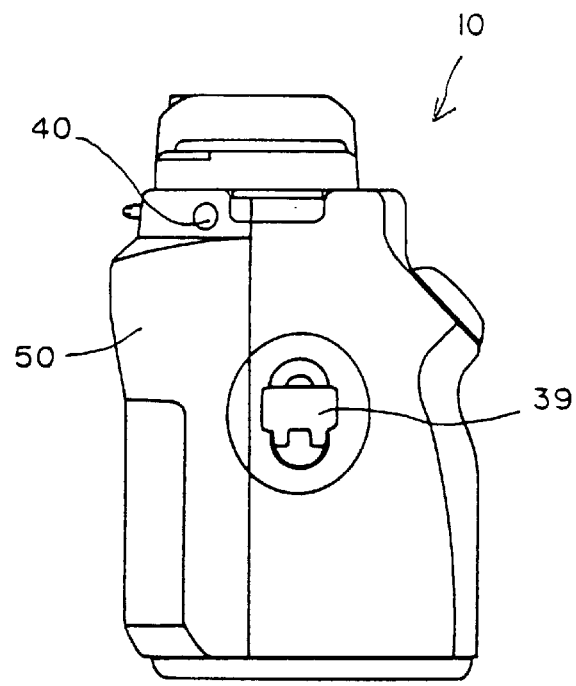
FIG. 3 is a left side elevation of a camera according to an embodiment of the present invention.
Figure 4:
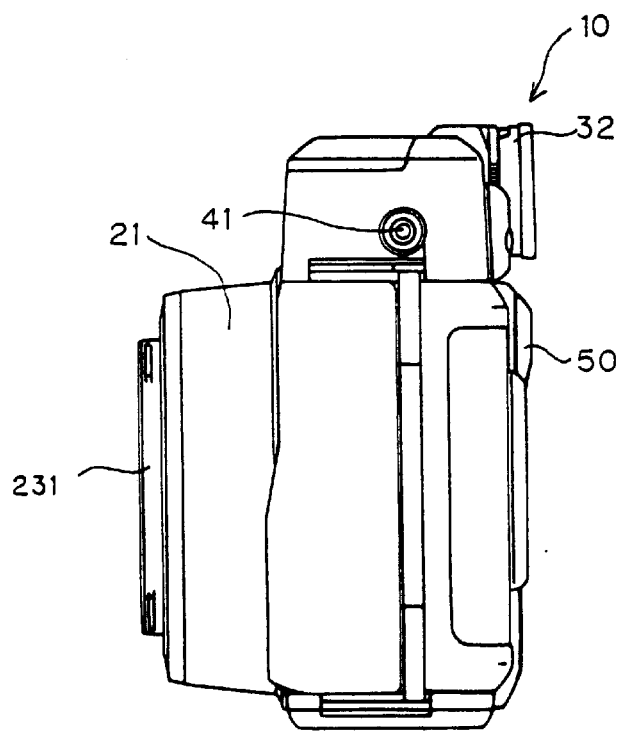
FIG. 4 is a right side elevation of a camera according to an embodiment of the present invention.

FIG. 1 is a front elevation of a camera according to an embodiment of the present invention. FIG. 2 is a plan view of a camera according to the embodiment of the present invention. FIG. 3 is a left side elevation of a camera according to the embodiment of the present invention. FIG. 4 is a right side elevation of a camera according to an embodiment of the present invention.

A camera 10 has a zoom lens. FIG. 2 shows a lens barrel 20 which constitutes the zoom lens. The lens barrel 20 comprises a fixed barrel 21, a back barrel 22 and a front barrel 23. At the front edge portion of the front barrel 23 there is provided a filter ring 231. An outer wall of the filter ring 231 is covered with a circular lens cap (not illustrated) to protect a photographic lens 202 (cf. FIG. 1).

As shown in FIG. 1, at the position of the inside of the filter ring 231 and the outside of the photographic lens 202, there is disposed a cap sensor 203 for detecting as to whether the lens cap is covered. The cap sensor 203 will be described in detail later.

On a top body panel 31 of the upper portion of a camera main frame 30, there are provided, as seen from FIG. 1, an AF window 311 into which a sensor for an auto focus (AF) is incorporated, a finder window 321 for a finder 32, a light intake window 322, a flash light control window 323 for leading light to an internal electronic flash photometric sensor, and an AE window 324 for leading light to an internal exposure control sensor. Below the top body panel 31 there is provided a self window 325 which incorporates thereinto a light emitting device for emanating light at the time of the self timer photography.

At the left side of the front elevation shown in FIG. 1 there is disposed a grip 33 to be griped at the time of the photography, and at the upper portion of the grip section 33 there is provided a shutter button 34 which is disposed with diagonally upward orientation and diagonally inside orientation. Between the grip section 33 and the lens barrel 20, there is provided a recess 35 (cf. FIG. 2) which allows the fingertips to enter when the grip is grasped, and thus this makes it possible to easily grasp the grip section 33. As seen from FIG. 1, the shutter button 34 is disposed at a relatively lower position. It is noted that according to the present embodiment a medium-format camera is used. The arrangement of the shutter button 34 at the position in height as shown in FIG. 1 makes it possible to contribute to both an improvement of the grip performance and a facility of depression of the shutter button 34. Particularly, in the event that a photograph is taken while the camera 10 is set vertically, the arrangement of the shutter button 34 at the position and the orientation as shown in FIG. 1 makes it possible that the shutter button 34 has a sufficient operability in the photography while the camera 10 is set vertically, although there is a camera having an additional shutter button for a vertical photography.

In the right side of the elevation shown in FIG. 1, there is shown a hinge 51 for switching a rear cover 50 (cf. FIGS. 2–4). Each of an upper portion 51a and a lower portion 51b of the hinge 51 has a double plate structure. The reason why this is to do so is that when the strong force is applied to the upper end or the lower end of the hinge 51 through for example, dropping the camera or hitting the camera against something, the shock force is checked by a deformation of the outside plate of the two plates of the double plate structure so as not to hinder the switching of the rear cover 50. The upper portion 51a of the hinge 51 serves as a hanger 38 which a belt for hanging the camera passes through.

In the right upper portion of the top body panel 31 shown in the elevation of FIG. 1, there is accommodated an electronic flash light emitting section employing a so-called swing up system. According to FIG. 1, the electronic flash light emitting section is in condition for accommodation. When an electronic flash is used, a button (not illustrated) of the rear end of the camera is depressed so that the electronic flash light emitting section is swung up.

Further, in the left upper portion of the top body panel 31 shown in the elevation of FIG. 1, there are provided a selection dial 36 for mode switching and an up-down dial 37 in an adjacent positional relationship. It is possible to turn the selection dial 36 in the state that a mode rock button 361 is depressed. Turning the selection dial 36 makes it possible to optionally select a sensitivity set up mode (ISO), a program mode (P), an aperture-priority mode (A), an additional aperture-priority mode (As) and a manual node (M) as well as an OFF state (OFF) shown in FIG. 2.

In the sensitivity set up mode (ISO), a photographic film speed is set up manually, and a setting of the film speed can be altered by turning the up-down dial 37. The film speed thus set is indicated in an LED 541 (cf. FIG. 8) provided on the rear cover 50.

In the program mode (P), an F-number or an aperture scale and a shutter speed according to a predetermined program are selected in compliance with brightness of the camera subject in photography.

In the aperture-priority mode (A) and the additional aperture-priority mode (As), an aperture scale is manually set up, and a shutter speed is automatically controlled in accordance with brightness of the camera subject in photography. A difference between these two aperture-priority modes (A, As) is a shutter speed. The details will be omitted. In the aperture-priority modes (A, As), turning the up-down dial 37 makes it possible to alter an aperture scale. The aperture scales thus set up or altered may be indicated in the LED provided on the rear cover 50.

In the manual mode (M), both the aperture scale and the shutter speed are manually set up in photography. Turning the up-down dial 37 makes it possible to alter an aperture scale. Turning the up-down dial 37 while a Tv button 371 is depressed makes it possible to alter the shutter speed. The aperture scales thus set up or altered may be indicated in the LED provided on the rear cover 50.

Further, as shown in FIG. 2, at the upper position of the camera 10, there are provided a diopter correction dial 326 for the finder 32 and an accessory shoe 327 for fixing an electronic flash accessory (not illustrated).

Furthermore, as shown in FIG. 3, at the left side of the camera 10, there are provided rear cover knob 39 for opening the rear cover 50 and a cable socket 40 for mounting a shutter cable.

Figure 5:
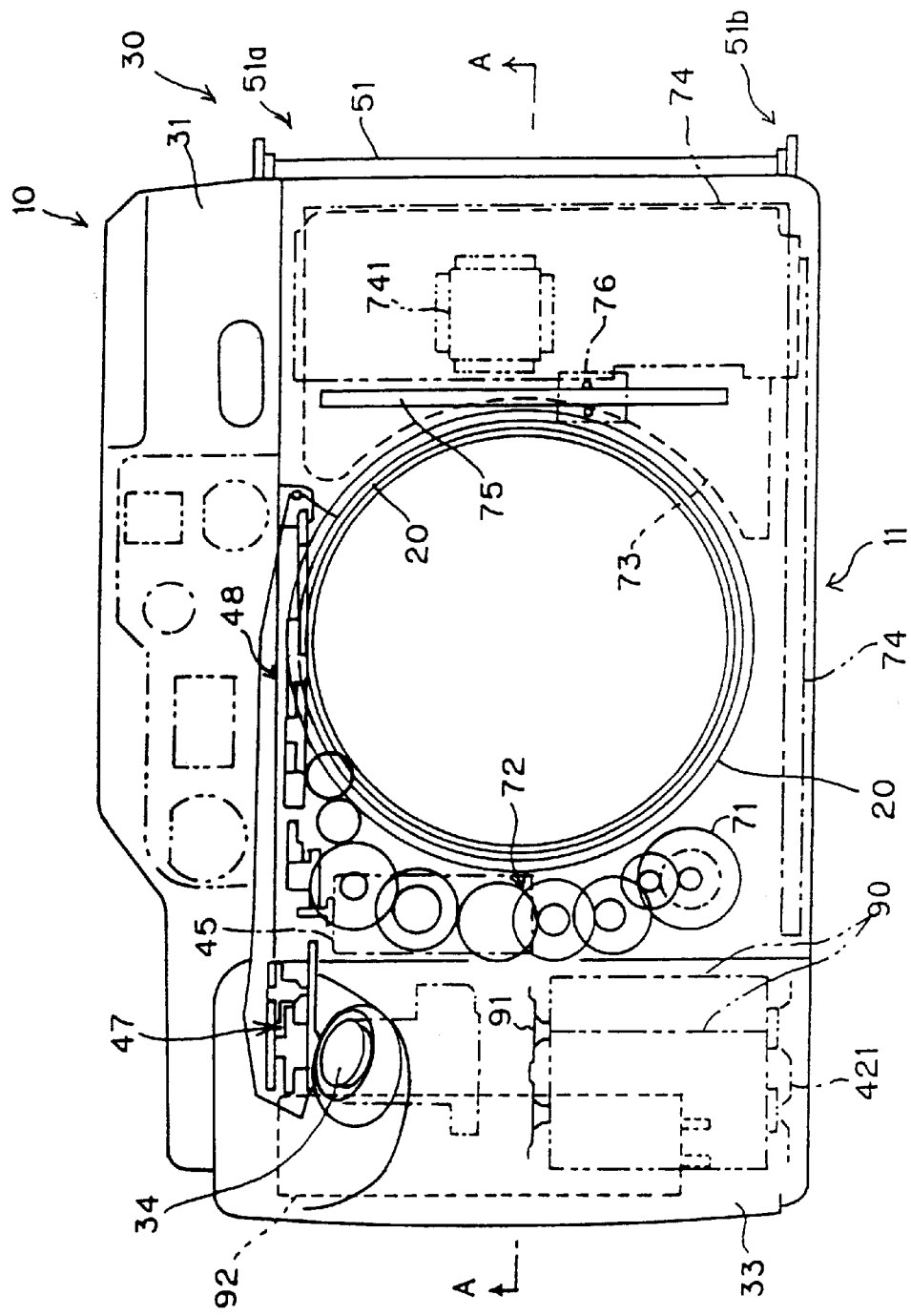
FIG. 5 is a front elevation of a part of the internal structure of the camera shown in FIGS. 1–4, seeing through the camera body.
Figure 6:
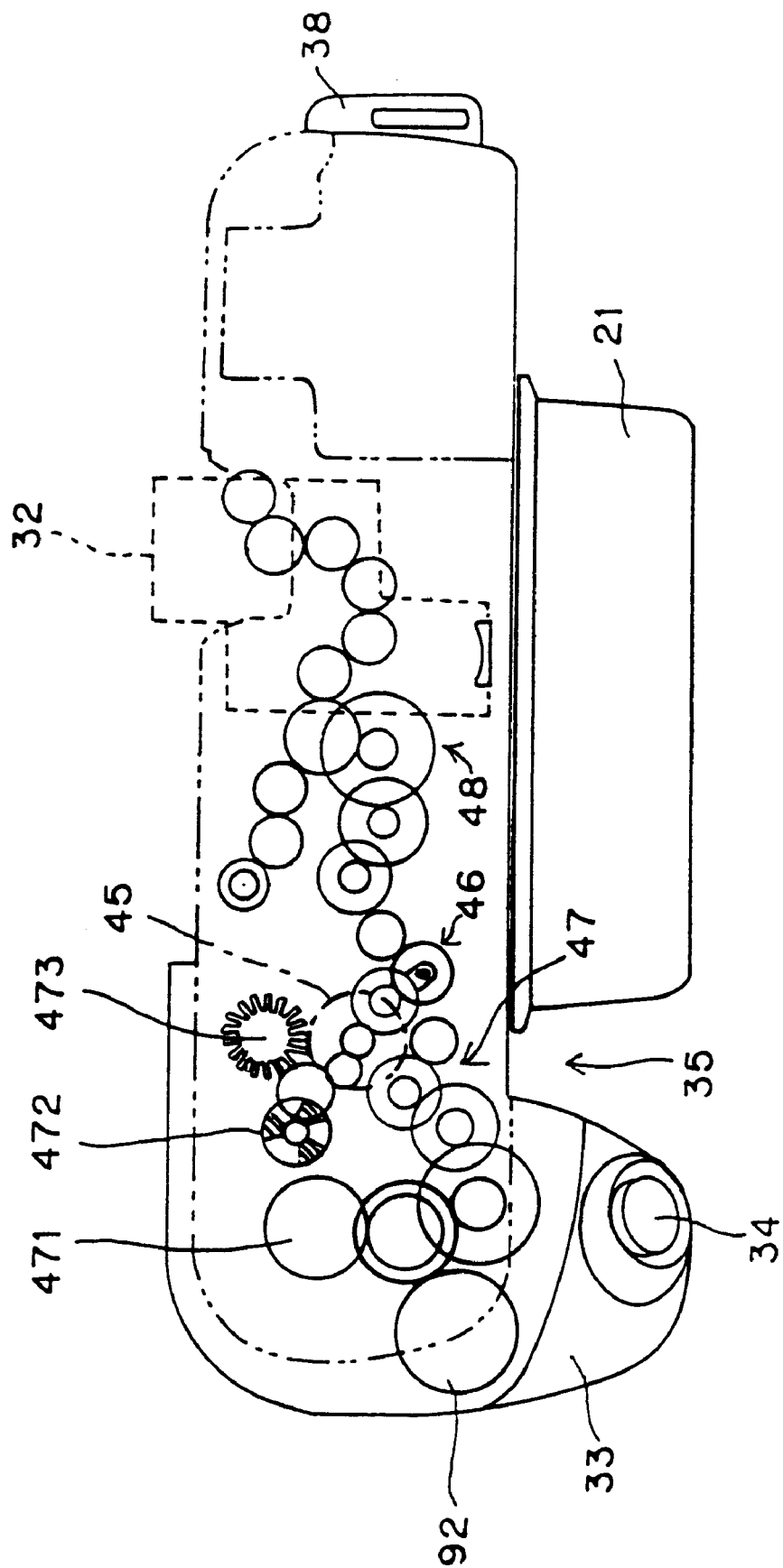
FIG. 6 is a plan view a part of the internal structure of the camera shown in FIGS. 1–4, seeing through the camera body.
Figure 7:
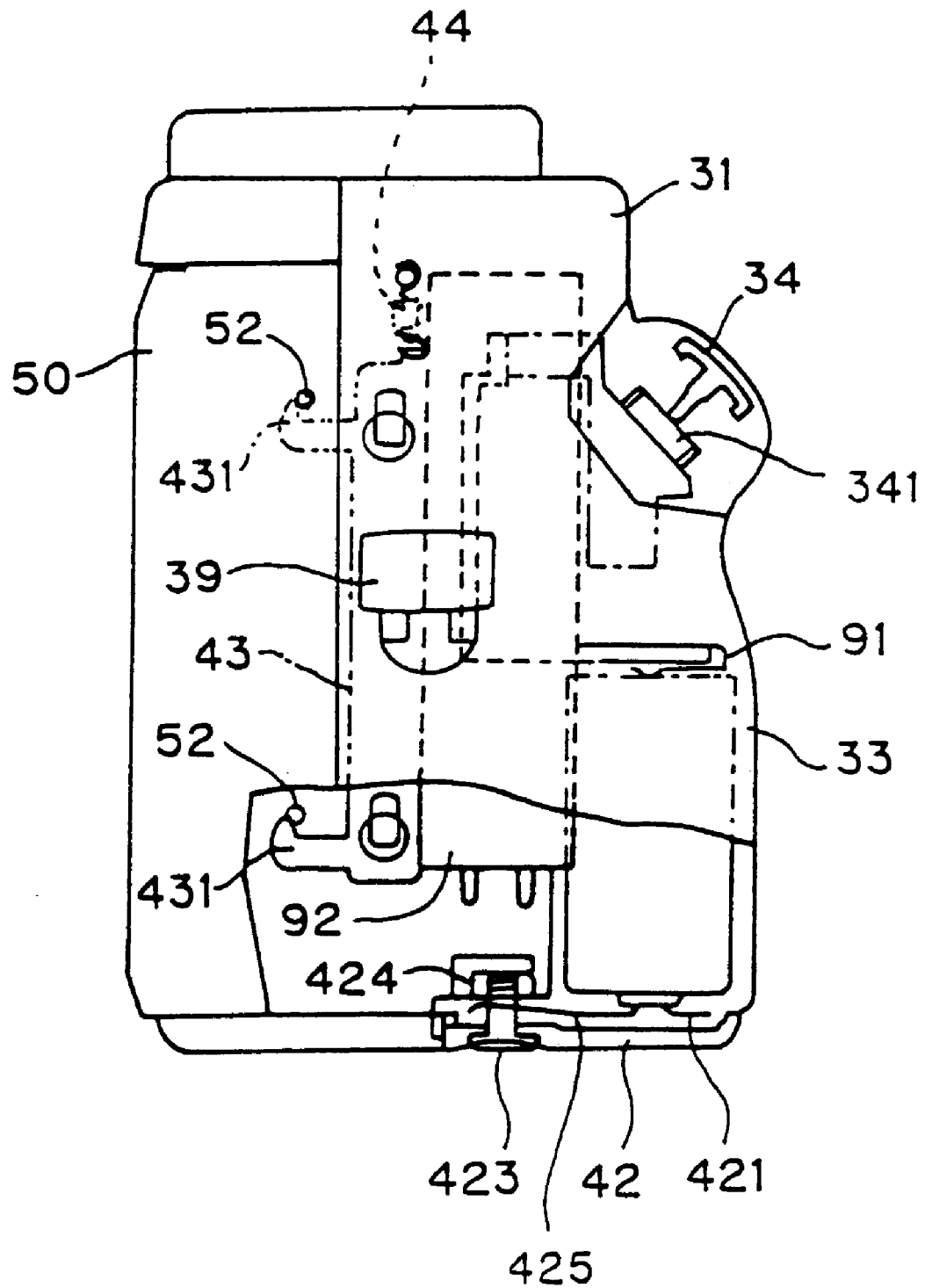
FIG. 7 is a left side elevation of a part of the internal structure of the camera shown in FIGS. 1–4, seeing through the camera body, and it is shown by a partially cutaway view.
Figure 8:
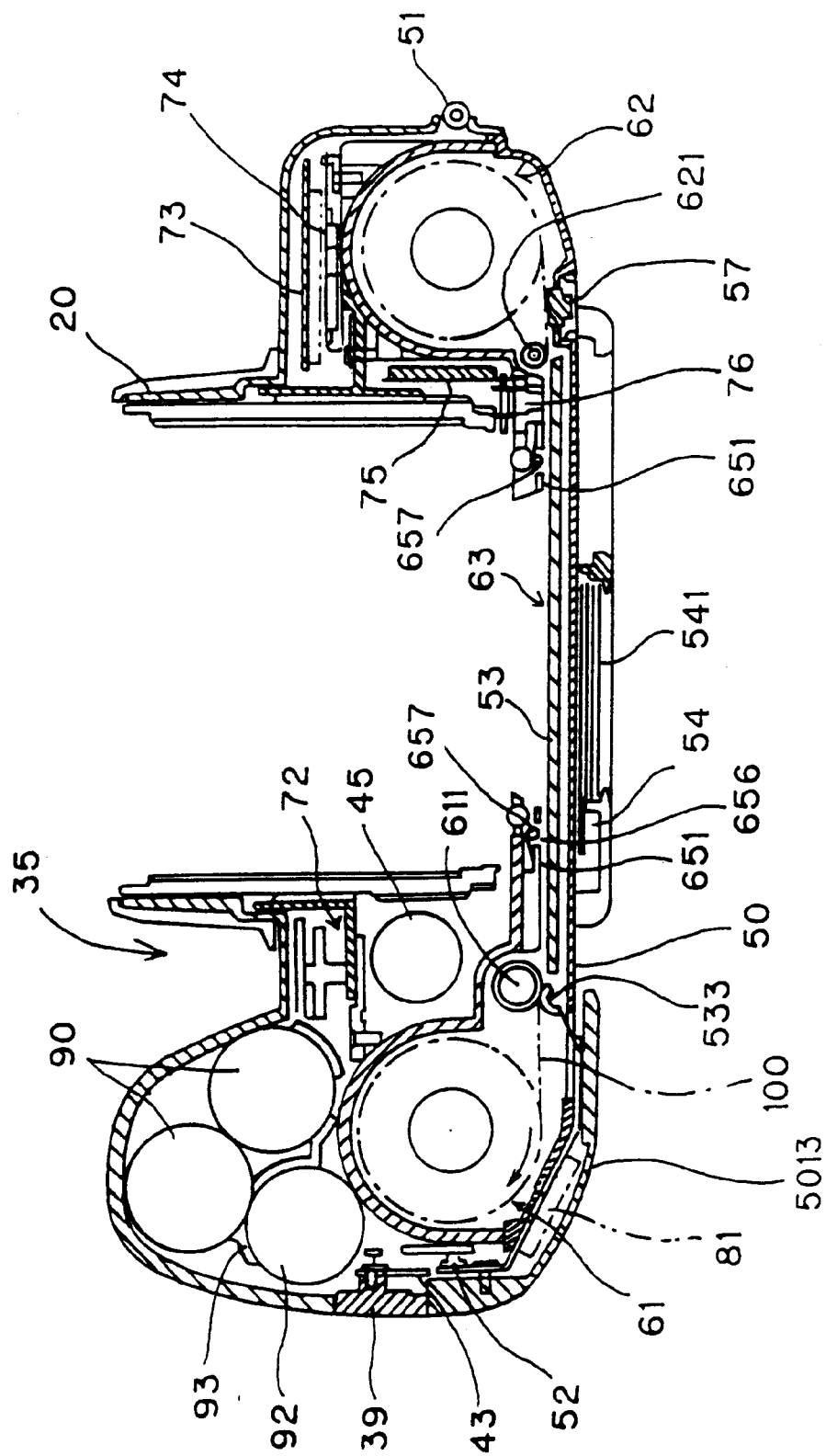
FIG. 8 is a section view taken along the arrow A—A of FIG. 5.

As shown in FIG. 4, at the right side of the camera 10, there is provided a synchro-socket 41 for mounting a synchro-cable which serves to inform an electronic flash accessory of a light emitting timing. FIG. 5 is a front elevation of a part of the internal structure of the camera shown in FIGS. 1–4, seeing through the camera body. FIG. 6 is a plan view a part of the internal structure of the camera shown in FIGS. 1–4, seeing through the camera body. FIG. 7 is a left side elevation of a part of the internal structure of the camera shown in FIGS. 1–4, seeing through the camera body, and it is shown by a partially cutaway view. FIG. 8 is a section view taken along the arrow A—A of FIG. 5. However, here the lens barrel is omitted.

A battery case 93 (cf. FIG. 8) below the grip section 33 of the camera main frame 30 incorporates therein two batteries 90 for driving the camera. These batteries 90 are sandwiched by a battery contact 91 (cf. FIG. 5) and a battery cover contact 421 which is mounted on a battery cover 42 (cf. FIG. 7), so that electric power may be supplied to the various circuits of the camera.

The battery cover 42 is fixed on the camera main frame 30 in such a manner that an engagement portion (not illustrated) right below in the side view shown in FIG. 7 is engaged with the camera main frame, and a screw 423 is engaged with a nut 424 provided on the camera main frame. Inside the battery cover 42 there is provided a spring member 425 united with the battery cover contact 421 to press the main frame side. The spring member 425 is used in order that in a state that the batteries 90 are not incorporated, the battery cover 42 is closed, and when the battery cover 42 is intended to be opened, it is easy to open the battery cover 42.

As shown in FIG. 8, behind the batteries 90 a main capacitor 92 for an electronic flash is incorporated. The main capacitor 92 is of a small in diameter as shown in FIG. 8. According to the present embodiment, an arrangement of the batteries 90 and the main capacitor 92 is considered so that a disposed position of the shutter button 34 is lowered to a position easy for an operation.

As shown in FIG. 7, inside the rear cover 50 there is provided a pin 52 which is engaged with a claw 431 of a rear cover lock plate 43 enabled upwards by a spring 44, in the main frame side, so that the rear cover 50 is locked in the closed state. When a rear cover knob 39 is operated, the rear cover lock plate 43 moves downward against the spring 44, so that an engagement of the claw 431 of the rear cover lock plate 43 with the pin 52 of the rear cover 50 is released to open the rear cover 50.

In the side view of FIG. 7, there is shown a tact switch 341 which is switched in response to a depression of the shutter button 34. The tact switch 341 is a two stage type switch in which the first stage is associated with a shutter half depression state (here, referred to as SP1), and the second stage is associated with a shutter full depression state (here, referred to as SP2).

At the intermediate position between the grip section 33 and the lens barrel 20 in FIG. 5, there is disposed vertically a feed motor 45 for feeding photographic film 100 (cf. FIG. 8). The feed motor 45 is reversible in rotation. In the forward rotation of the feed motor 45, a planetary gear 46 shown in FIG. 6 is engaged with a feed gear train 47 to rotate a film winding spool (not illustrated) disposed in a film wind chamber 61 (cf. FIG. 8) through the feed gear train 47, so that the photographic film 100, which is fed from a film feed chamber 62 via a film passage 63, is wound. At that time, a light projection and reception sensor (not illustrated) receives light passing through slits (not illustrated) perforated in a radial pattern on an encode plate 471 to generate pulses. The pulses thus generated are counted to measure an amount of rotation of the spool.

A counter roller 611 (cf. FIG. 8), which is provided near the inlet of the film wind chamber 61, rotates in compliance with a movement of the photographic film 100 to be wound into the film wind chamber 61. This involves a rotation of an encode plate 473 shown in FIG. 6 so that the light projection and reception sensor (not illustrated) converts the rotation of the encode plate 473 to pulses. An amount of winding of the photographic film is measured by counting the pulses.

Further, an amount of rotation of the feed motor 45 is measured by an encode plate 472 and the light projection and reception sensor (not illustrated).

On the other hand, when the feed motor 45 is reversibly rotated, the planetary gear 46 is switched to a side of a film pressure plate switching gear train 48 so that a rotation of the feed motor 45 is transmitted through the film pressure plate switching gear train 48 and a cam (not illustrated) to a film pressure plate switching pin 64. The film pressure plate switching pin 64 protrudes from an aperture 652 perforated on a rail surface 651 or sinks into the aperture 652 in accordance with an amount of rotation of the cam. When the film pressure plate switching pin 64 protrudes from an aperture 652, a film pressure plate 53, which is provided on the rear cover 50, is pressed to alter a space of a film passage 63 (cf. FIG. 8). According to the camera 10, it is possible to use two types of photographic roll film such as so-called 120 film and 220 film. In the 120 film, a leader paper is provided. On the other hand, in the 220 film, a sheet is connected to only the leading edge and the trailing edge of the photographic film. Accordingly, films are different in thickness by the corresponding leader paper in accordance with the type of film. Thus, there is a need to vary the space of the film passage.

In the camera 10, looking from the front elevation shown in FIG. 5, there is disposed the feed motor 45 between the grip section 33 and the lens barrel 20. This feature makes it possible to form between the grip section 33 and the lens barrel 20 a recess 35 which allows fingers to enter when the grip section 33 is grasped, thereby contributing to an operability of the camera 10.

Further, an arrangement of the feed motor 45 in this position makes it possible, as shown in FIG. 6, to dispose the feed gear train 47 and the film pressure plate switching gear train 48 separately left and right of the feed motor 45. Thus, it is possible to reduce the number of gears by the correspondence. This contributes to the effective transmission for a driving force of the feed motor 45, the reduction of the number of the parts and the reduction of the cost.

In FIG. 5, beneath between the grip section 33 and the lens barrel 20 there is disposed a lens barrel driving motor 71. A driving force of the lens barrel driving motor 71 is transmitted through a lens barrel driving gear train 72 to the lens barrel 20. The structure and the performance of the lens barrel 20 will be described later.

Further, in FIG. 5, at the right of the lens barrel 20, there is disposed a print substrate 73 for an electronic flash, which is loaded with a circuit for the electronic flash, in such a manner that the print substrate 73 faces the front of the camera 10, and in parallel to the print substrate 73 there is disposed a flexible print substrate 74 for a control, which is loaded with a control circuit 741. The flexible print substrate 74 spreads in parallel to a bottom 11 of the camera to the lower portion of the lens barrel 20. Further, at the right of the lens barrel 20, there is disposed a flexible print substrate 75 for a shutter.

In FIG. 5, at the position which overlaps with the flexible print substrate 75 for a shutter, there is shown a bar code sensor. A bar code will be described later.

In FIG. 8, there are shown a film pressure plate 53 mounted inside the rear cover 50, an LCD 541 fixed on the outside of the rear cover 50 with an LCD 54, a counter presser bar spring 533 for pressing both edges of the photographic film 100 with respect to the width direction (a vertical direction to the sheet of FIG. 8) to a counter roller 611, a presser roller 657 elastically protruding from an aperture 656 of a rail surface 651 toward the rear cover 50 side to press the photographic film 100 to the film pressure plate 53, a guide roller 621 for guiding the photographic film 100, said guide roller 621 being provided at the outlet portion of the film feed chamber 62 coupled to the film passage 63, a film pressure plate manually switching button 57 for manually select a position of the film pressure plate 53 with respect to an optical axis according as a film presser switching pin 64 (cf. FIG. 9) for pressing the film pressure plate 53, which is provided inside the rear cover 50, is protruded or not, and an EL-use electronic parts 81 for an LCD display disposed inside a rear cover grip section 5013.

Figure 9:
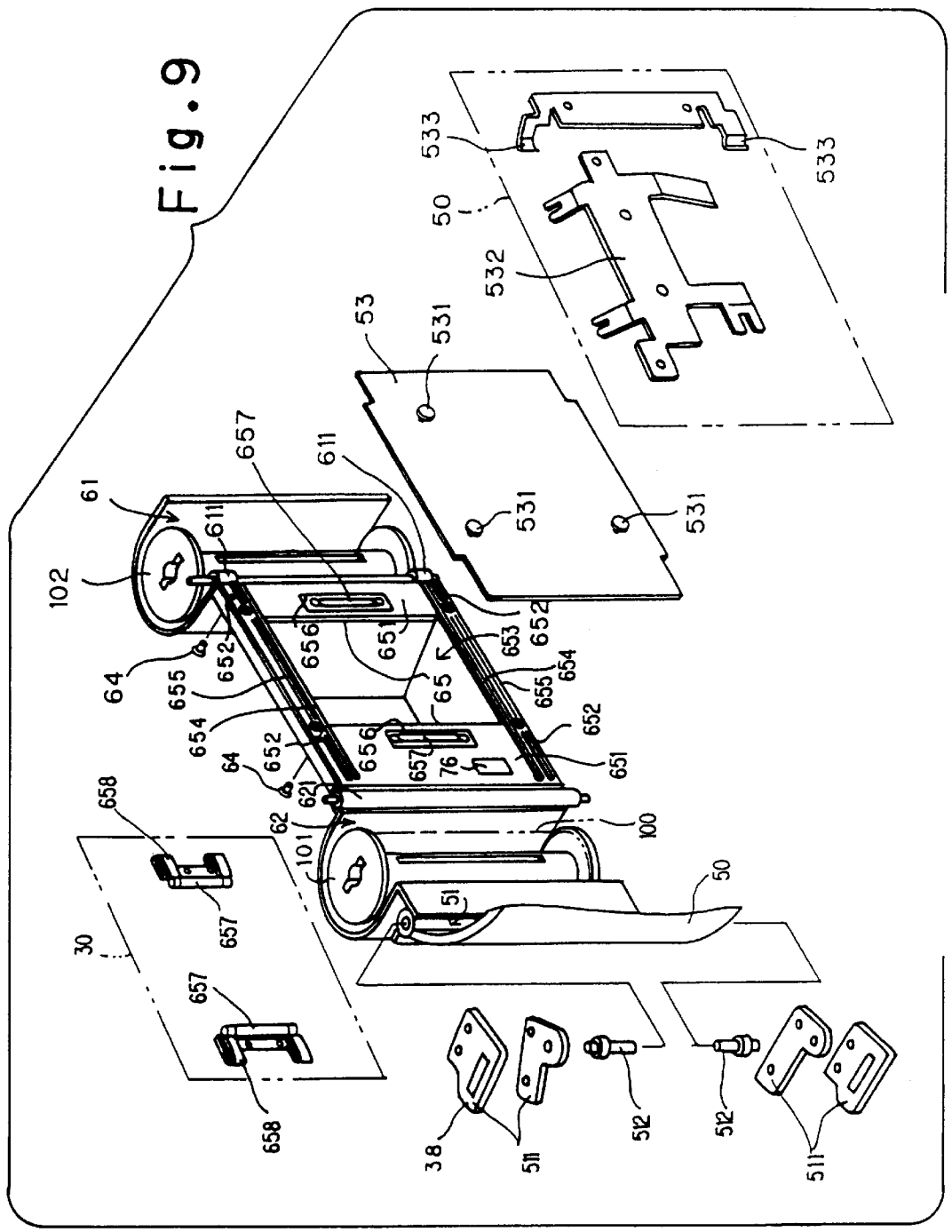
FIG. 9 is an exploded perspective view of a film passage portion of the camera wherein a rear cover is opened, according to an embodiment of the present invention.

FIG. 9 is an exploded perspective view of a film passage portion of the camera wherein a rear cover is opened, according to an embodiment of the present invention.

At both sides of a rail surface frame 65 there are disposed the film feed chamber 62 and the film wind chamber 61. A spool 101 on which the photographic film 100 (not subjected to the photograph) is wound is mounted to the film feed chamber 62, a lead paper portion (not illustrated) of the tip of the photographic film 100 is pulled out and wound on an empty spool 102 mounted in the film wind chamber 61 via the guide roller 621, the rail surface 651 and the counter roller 611, and in this condition the rear cover 50 is closed. Open and shut of the rear cover 50 is detected by a rear cover switch not illustrated. The rail surface frame 65 has at its center portion an aperture 653 for introducing light passing through a photographic lens (not illustrated) to the photographic film. At upper and lower portions of the aperture 653 on the rail surface 651, there are provided film rails 654 for determining the reference position of the photographic film 100 with respect to the optical axis, respectively, each of the film rails 654 extending horizontally. At the upper side of the upper film rail 654 and the lower side of the lower film rail 654, there are provided film pressure plate receiving rails 655 each adjacent to the associated film rail, respectively, each of the film pressure plate receiving rails 655 extending horizontally. Each of the film pressure plate receiving rails 655 is higher than the film rail 654 in height from the rail surface. When the film pressure plate switching pin 64 sinks into the aperture 652, the film pressure plate 53 is in contact with the film pressure plate receiving rails 655 in a state that the rear cover 50 is closed, so that a film passage 63 (cf. FIG.

8) having a predetermined space is formed between the film rails 654 and the film pressure plate 53.

A film pressure plate pin 531 is provided on the back of the film pressure plate 53. The film pressure plate pin 531 is engaged with a film pressure plate spring 532 which is fixed on the inner wall of the rear cover 50, so that the film pressure plate 53 is elastically pressed to the film pressure plate receiving rails 655.

As explained with reference to FIG. 6, when the feed motor 45 is reversibly rotated, the driving power is transmitted through the planetary gear 46, the film pressure plate switching gear train 48 and a cam (not illustrated) to the film pressure plate switching pin 64, so that the film pressure plate switching pin 64 protrudes from the aperture 652. While FIG. 9 simply shows upper two film pressure plate switching pins 64, there are additionally lower two film pressure plate switching pins 64. Thus, the total four film pressure plate switching pins 64 simultaneously protrude. Then, the film pressure plate 53 is in contact with the tips of the film pressure plate switching pins 64, but not the film pressure plate receiving rails 655, so that the film pressure plate 53 is pressed toward the rear cover 50 side to form a film passage which is broader in space as compared with a case where the film pressure plate switching pin 64 sinks. The height of the film pressure plate receiving rails 655 and the protruding height of the film pressure plate switching pins 64 are controlled so that the film passage having a broader space involved in the state that the film pressure plate switching pin 64 protrudes is suitable for the 120 film in which a leader paper is provided for the film, while the film passage having a narrower space involved in the state that the film pressure plate switching pin 64 sinks is suitable for the 220 film having no leader paper. The film pressure plate switching pin 64 is enabled by a spring force in a direction such that the film pressure plate switching pin 64 sinks. When the film feed motor 45 rotates further in the reverse rotation direction, the film pressure plate switching pin 64 sinks into the inside of the aperture 652 by the effect of the enabling spring force and the cam, so that the film pressure plate 53 is in contact with the film pressure plate receiving rails 655. It is detected by a film pressure plate switching detection sensor whether the film pressure plate switching pin 64 protrudes or sinks.

An inner wall of the rear cover 50 is provided with the counter presser bar spring 533. As mentioned above, the counter presser bar spring 533 serves to press both the edges of the photographic film with respect to the width direction to the counter roller 611.

At the center portions of the left and right of the aperture 653 on the rail surface 651, there are provided apertures 656, respectively. A presser roller 657 projects from each of the apertures 656 with respect to the rail surface 651. The presser rollers 657 are mounted through plate springs 658 on the camera main frame 30, as separately shown in FIG. 9. Consequently, the presser roller 657 elastically protrudes from the aperture 656 of the rail surface 651 to press the center portion of the photographic film with respect to the width direction to the film pressure plate 53.

A bar-code sensor 76 is provided between the presser roller 657 located in the film feed chamber 62 side of the two presser rollers 657 and the guide roller 621.

At each of the upper portion and the lower portion of the hinge portion 51 between the rear cover 50 and the camera main frame 30, two plates 511 are fixed by the associated pins 512, respectively. As described above, the upper one plate of the upper two plates 511 serves as the belt hanger 38.

Also as described above, the use of double plates 511 makes it possible to avoid such a trouble that the rear cover 50 does not open, even if a shock is applied to the corner of the hinge 51 by dropping the camera, hitting the camera against something, etc.

Figure 10:
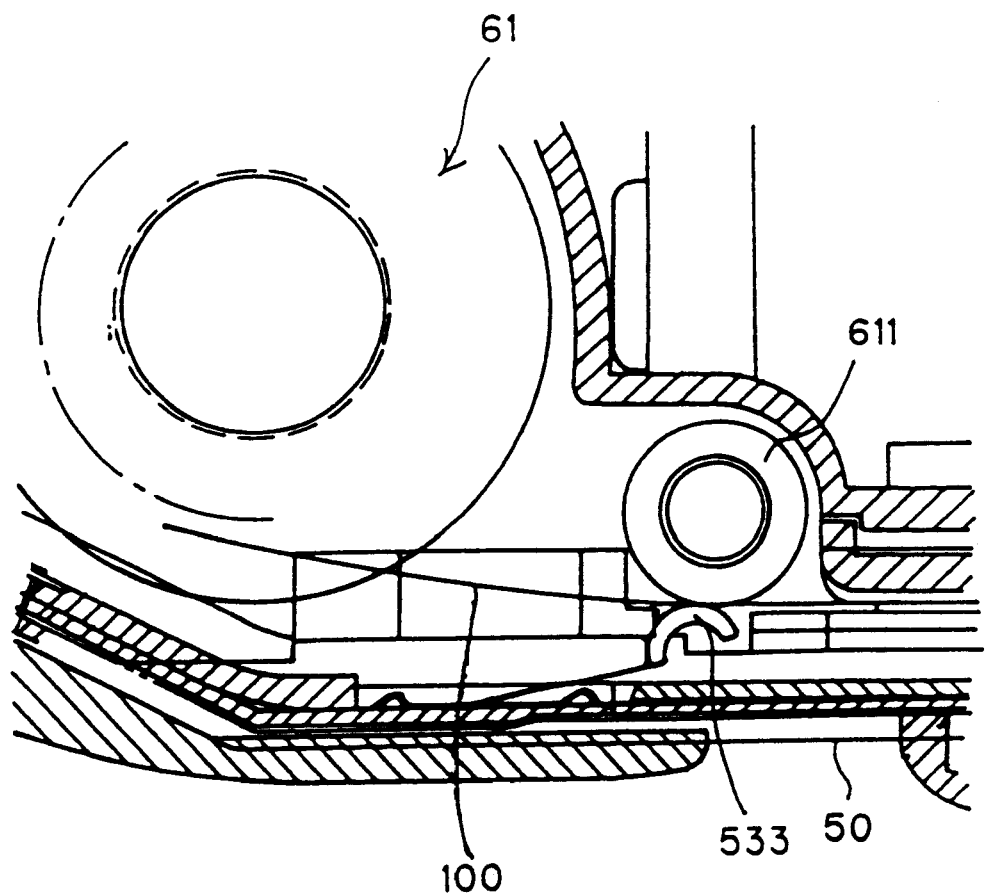
FIG. 10 is an enlarged sectional view of an inlet portion of the film wind chamber.

FIG. 10 is an enlarged sectional view of an inlet portion of the film wind chamber 61 shown in FIG. 8.

As shown in FIG. 10, the counter presser bar spring 533 is provided on the inner wall of the rear cover 50 at the position between the inner wall and the counter roller 611.

Figure 11:
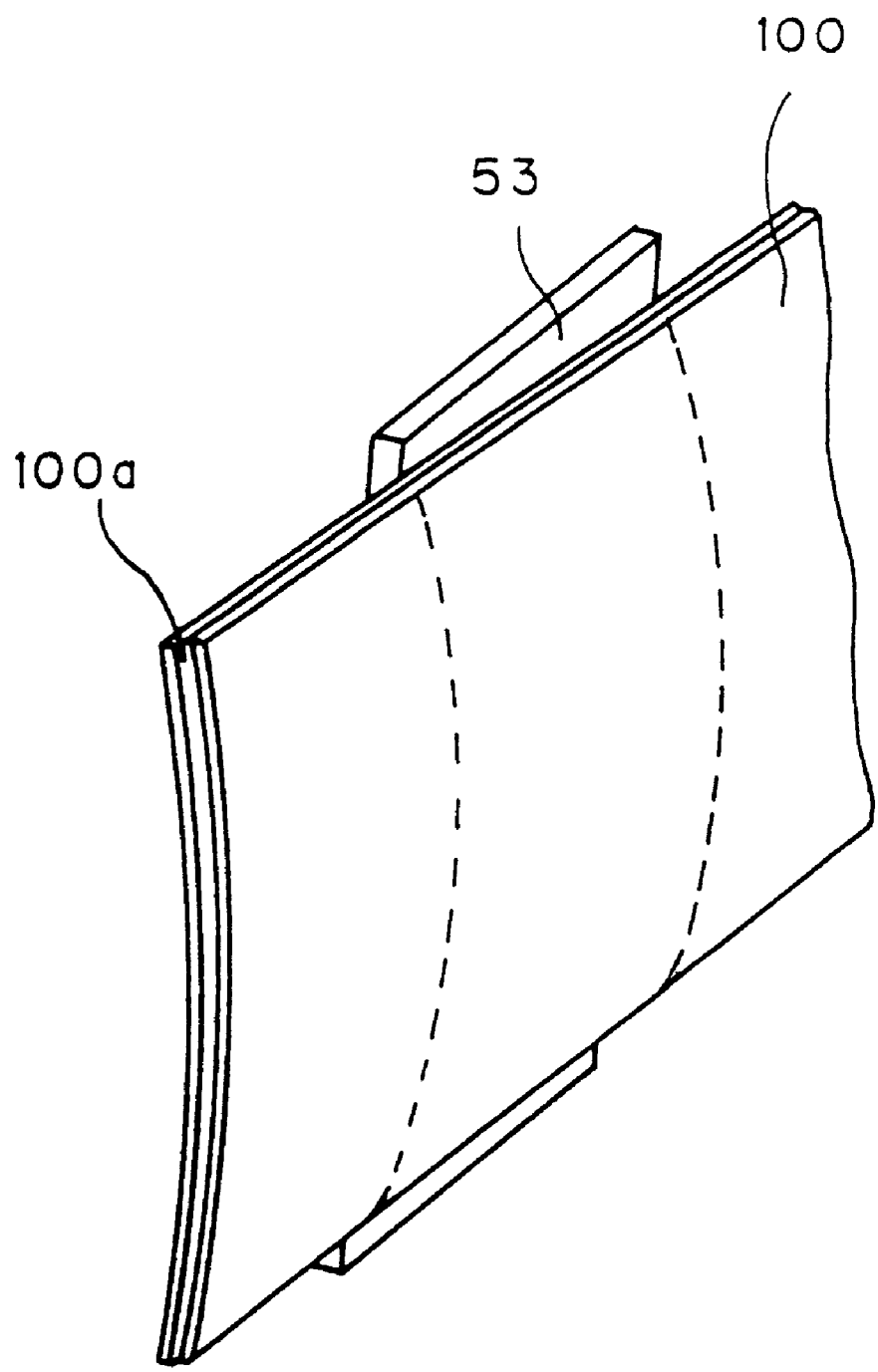
FIG. 11 is an explanatory view useful for understanding the counter presser bar spring and the presser roller.

FIG. 11 is an explanatory view useful for understanding the counter presser bar spring 533 and the presser roller 657.

FIG. 11 shows an 120 type of photographic film in which the leader paper 100a is provided on the back of the photographic film 100. When tension is applied to the photographic film 100 between the film fed chamber and the film wind chamber, as seen from FIG. 11, the center portion of the film with respect to the width direction (the vertical direction in FIG. 11) curves in a direction that it goes away from the film pressure plate 53. The presser roller 657 shown in FIG. 9 is intended to maintain an evenness of the film by pressing the curved film center portion to the film pressure plate 53. Providing that the counter presser bar spring 533 (cf. FIGS. 9 and 10), which presses only the edge portions of the film with respect to the width direction (the vertical direction in FIG. 11) to the counter roller 611 side, is replaced by a roller and the like pressing the film throughout the film width to the counter roller 611 side, the film will be warped. Consequently, it is difficult to ensure an excellent evenness of the film even if the film is pressed by the presser roller 657 to the film pressure plate 53. According to the present embodiment, since only both the edges of the film with respect to the width are pressed by the counter presser bar spring 533 to the counter roller 611 side, it is possible to ensure the 'natural curve' of the photographic film 100, as shown in FIG. 11. Thus, pressing the photographic film of the 'natural curve' by the presser roller 657 to the film pressure plate 53 makes it possible to ensure an extremely excellent evenness of the film on the portion of the aperture 653 through which photographic light is incident on the film.

According to the present embodiment, presser roller 657 is to press only the center portion of the photographic film 100 with respect to the width direction. This is more advantageous on a space basis as compared with a case where the presser roller for pressing the photographic film 100 in its entirety with respect to the width direction, and cheaper materials can be used. Further, it is possible to ensure an evenness of the film standing comparison with a case where the photographic film is pressed in its entirety with respect to the width direction.

Figure 12:
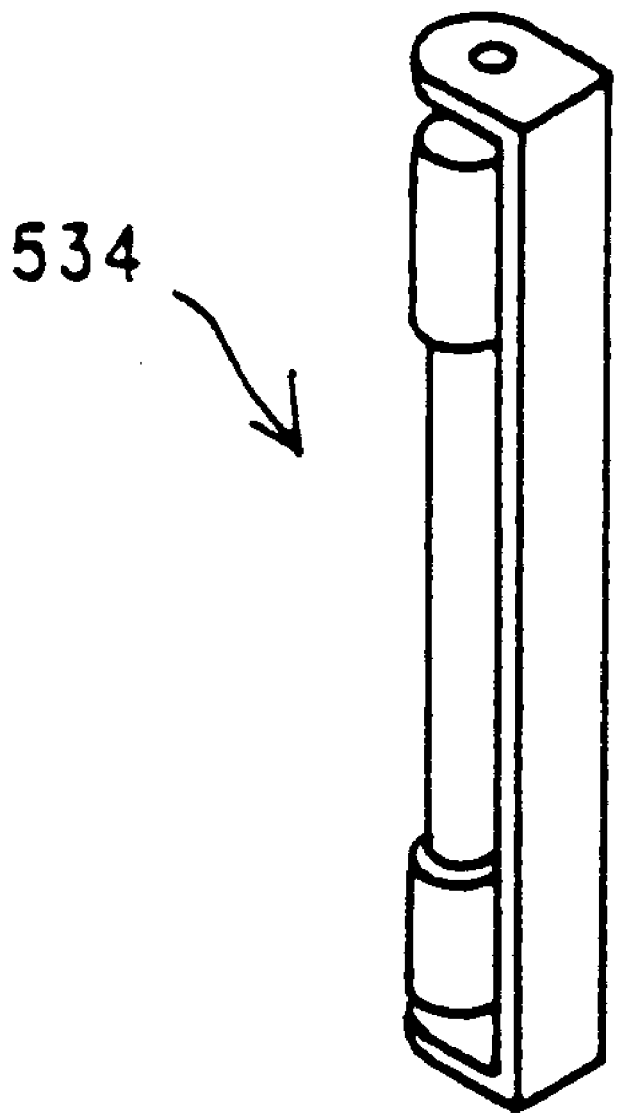
FIG. 12 is a view of the counter presser bar roller which can be replaced by the counter presser bar spring shown in FIG. 9.
Figure 13:
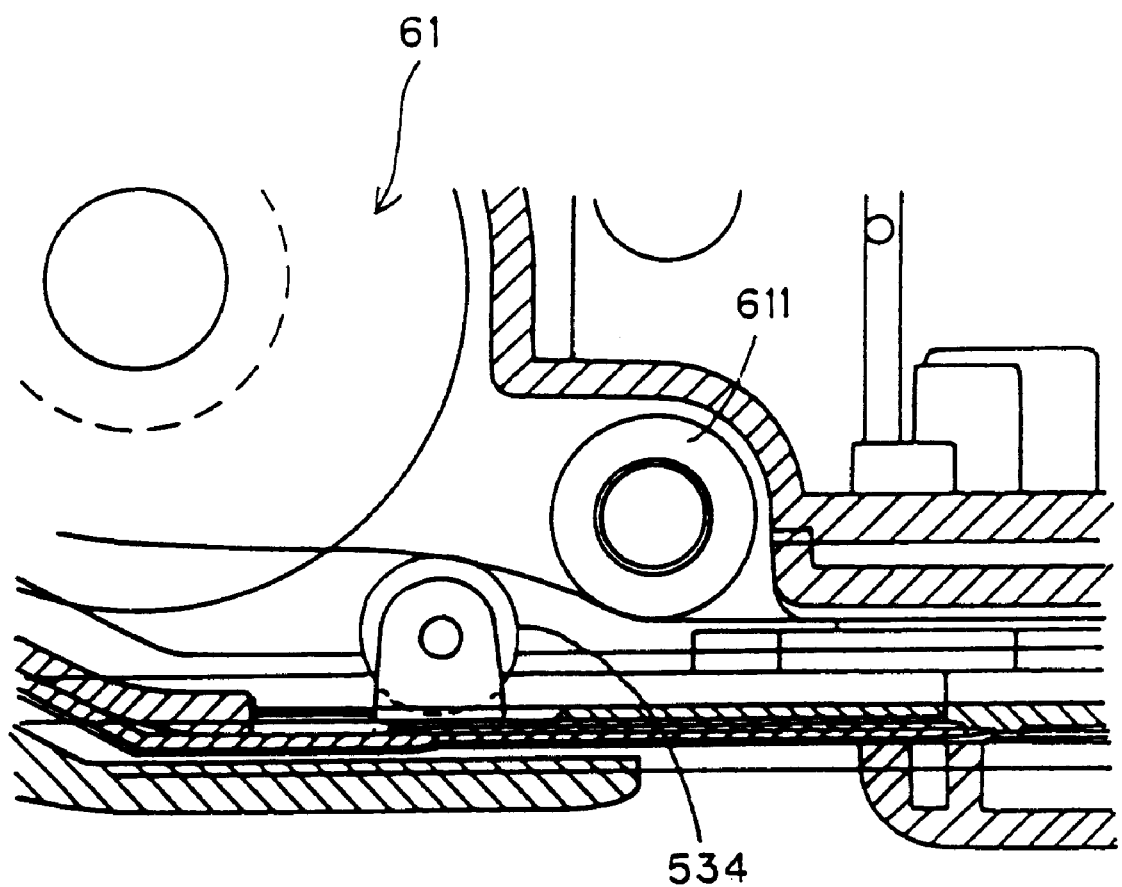
FIG. 13 is an enlarged sectional view of an inlet portion of the film wind chamber in the event that the counter presser bar roller is adopted.

FIG. 12 is a view of the counter presser bar roller which can be replaced by the counter presser bar spring 533 shown in FIG. 9. FIG. 13 is an enlarged sectional view of an inlet portion of the film wind chamber in the event that the counter presser bar roller is adopted.

A counter presser bar roller 534 is of a large diameter in both the edge portions only so as to press only both the edges portions of the photographic film with respect to the width direction. As shown in FIG. 13, the counter presser bar roller 534 is disposed at the position near the inside of the film wind chamber 61 as compared with the counter roller 611.

As described above, it is either acceptable that the film pressing member for pressing both the edges portions of the photographic film with respect to the width direction in the film wind chamber 61 side is a spring or a roller. And the pressing position is optionally selectable in some degree as shown in FIGS. 10 and 12.

Figure 14:
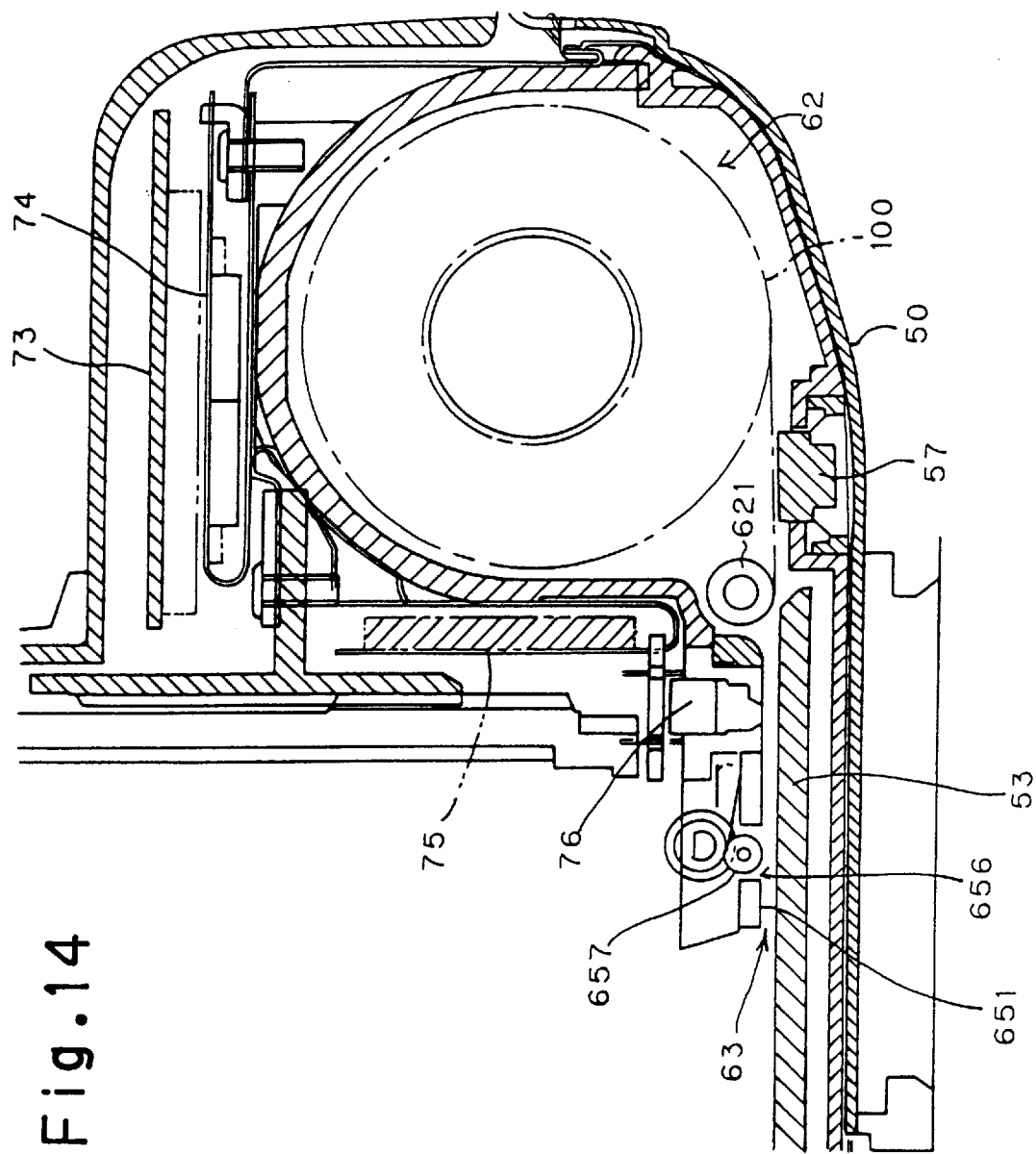
FIG. 14 is a partially expanded sectional view of the film feed chamber.

FIG. 14 is a partially expanded sectional view of the film feed chamber 62 shown in FIG. 8.

At an outlet of the film feed chamber 62 connected with the film passage 63, there is provided a guide roller 621 for guiding the photographic film 100. As explained with reference to FIG. 9, at the aperture 656 of the rail surface 651, there is provided the presser roller 657 so that the photographic film 100 is fed to the film wind chamber 61 while the film is pressed by the presser roller 657 to the film pressure plate 53. Further, there is provided the bar-code sensor 76 between the guide roller 621 and the presser roller 657.

Figure 15A:
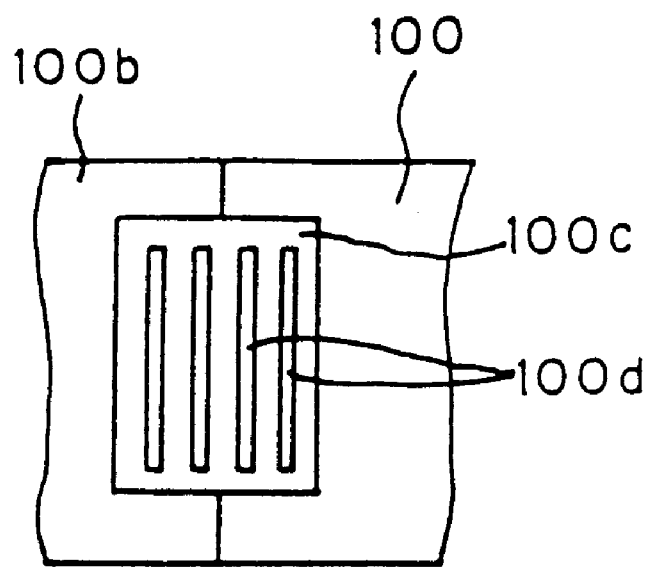
FIGS. 15(A) and 15(B) are illustrations showing the structure of the leading edge of the photographic film.
Figure 15B:
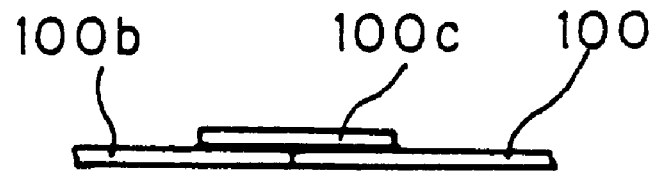

FIGS. 15(A) and 15(B) are illustrations showing the structure of the leading edge of the photographic film.

Connected to the leading edge of the photographic film 100 is a lead paper 100b by appending a label 100c on which bar codes 100d indicative of type and sensitivity of the photographic film 100 are printed.

When the label 100c passes through the position facing against the bar-code sensor 76, the bar codes 100d are read by the bar-code sensor 76. However, since the label 100c is appended to the leading edge portion of the photographic film 100, the photographic film 100 is easy to bend on the leading edge portion. Further, until the bar codes 100d are read to determine a type and the like of the film, the film passage 63 is set to provide the broad passage so that the thick film appended with the label 100c passes through the film passage 63. Thus, if the evenness of the label 100c on the portion of the bar-code sensor 76 is not ensured surely, there is a possibility that the bar codes 100d are not properly read.

Figure 16:
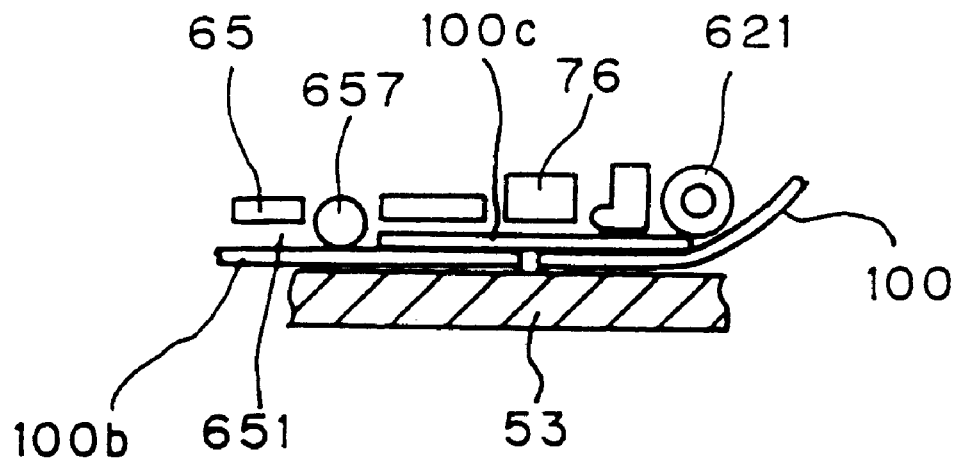
FIG. 16 is an illustration showing means for ensuring the evenness of the label in the present embodiment.
Figure 17:
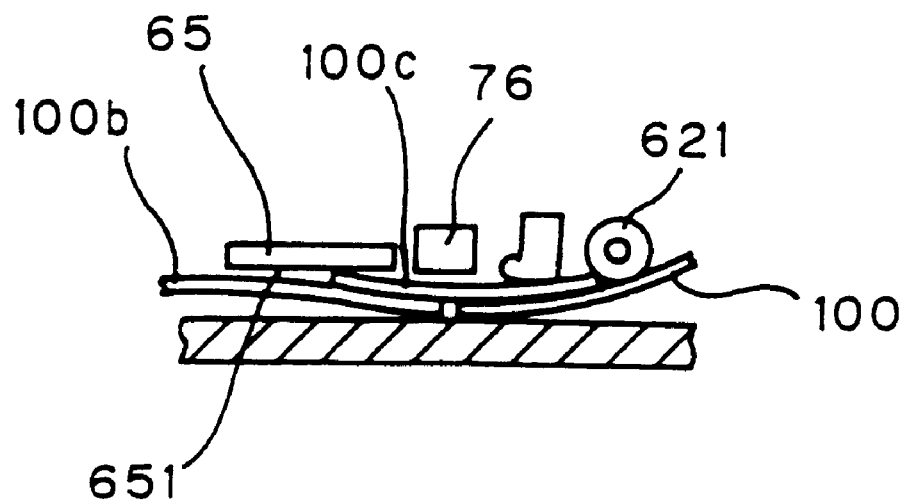
FIG. 17 is an illustration showing a case (a comparative example) wherein no positive measures are taken to maintain the evenness of the label.

FIG. 16 is an illustration showing means for ensuring the evenness of the label 100c in the present embodiment. FIG. 17 is an illustration showing a case (a comparative example) wherein no positive measures are taken to maintain the evenness of the label.

According to the present embodiment, the presser roller 657 for ensuring the evenness of the photographic film 100 on the aperture 653 (cf. FIG. 9) through which photographic light is incident serves as means for ensuring the evenness of the label 100c which passes through the portion of the bar-code sensor 76. Thus, it is possible to preferably maintain the evenness of the label 100c, as compared with the comparative example shown in FIG. 17 in which the presser roller 657 is not adopted.

Figure 18:
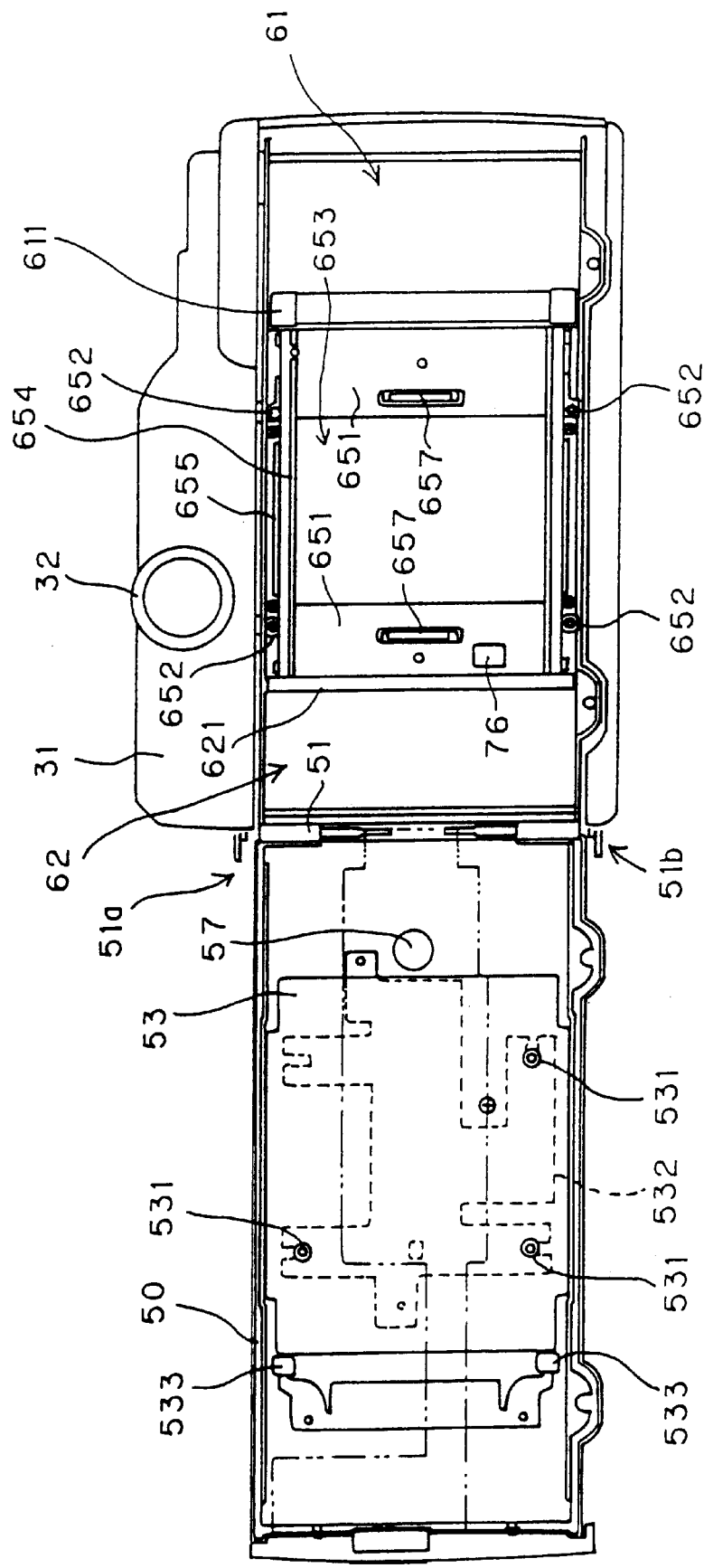
FIG. 18 is a rear elevation of the camera according to the present embodiment in which the rear cover is opened.

FIG. 18 is a rear elevation of the camera according to the present embodiment in which the rear cover is opened.

Here, there will be explained the film pressure plate manually switching button 57 omitting the redundant explanation.

The film pressure plate manually switching button 57 causes the film pressure plate switching pin 64 shown in FIG. 9 to protrude from the aperture 652 or sink into the aperture 652 in accordance with rotation of the feed motor 45 in the reverse direction, so that whenever the film pressure plate manually switching button 57 is depressed once, the width of the film passage is expanded for the 120 type of film or is narrowed for the 220 type of film. At the point when the film pressure plate manually switching button 57 is depressed, the film pressure plate switching pin 64 does not operate. When a film is mounted, the rear cover 50 is closed, and the film is fed to set the first frame, the width of the film passage (position of the film pressure plate 53 with respect to the direction of the optical axis) is controlled to meet the mounted film.

At that time, when a film having bar codes is mounted to read the bar codes, the manual setting by the film pressure plate manually switching button 57 is disregarded, and the film type read through the bar codes is adopted.

According to the conventional camera, there is often adopted such an arrangement that when a film is mounted, the film pressure plate is operated per se to control the width of the film passage to meet the mounted film. A user of this type of camera is used to performing a changeover of the film pressure plate according to the alteration of the type of a film in the state that the rear cover is opened. Thus, according to the present embodiment, the film pressure plate manually switching button 57 is disposed inside the rear cover 50 to satisfy the familiar operation. Further, according to the present embodiment, the type of the film, which is suitable for the film pressure plate position to be altered by depression of the film pressure plate manually switching button 57, is displayed on the LED 541 (cf. FIG. 8) provided on the outer surface of the rear cover 50.

Figure 19:
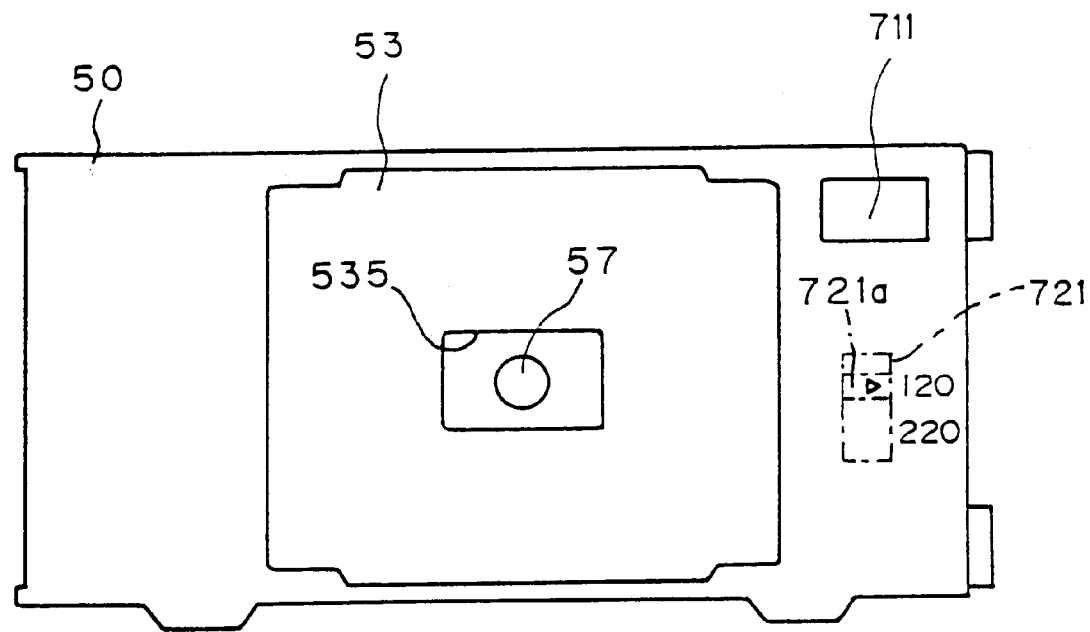
FIG. 19 is an illustration showing an example in which a location of the film pressure plate selection button is varied.

FIG. 19 is an illustration showing an example in which a location of the film pressure plate selection button is varied.

According to the present embodiment, inside the rear cover 50 there is provided the film pressure plate 53 having the aperture 535 at the center, and inside the aperture 535 there is provided the film pressure plate manually switching button 57.

As seen from the above, an arrangement position of the film pressure plate manually switching button 57 is nor restricted to the arrangement position in the embodiment shown in FIG. 18.

Further, in FIG. 19 there is provided a second LCD 711 inside the rear cover 50. Whenever the film pressure plate manually switching button 57 is depressed, the symbols "120" and "220" indicative of the type of the film are alternatively displayed on the LCD 711, and the film pressure plate is controlled to a film pressure plate position suitable for the displayed film in the above-mentioned timing. In this manner, if it is permitted in cost, it is acceptable that inside the rear cover 50 there is provided a display unit which is switched in display in cooperation with the operation with the film pressure plate manually switching button 57.

Furthermore, in FIG. 19, there is shown a slide switch type of film pressure plate manually changing over switch 721 instead of the film pressure plate manually switching button 57. The symbol marks "120" and "220" are printed beside the film pressure plate manually changing over switch 721. When a handler 721a of the film pressure plate manually changing over switch 721 is slid to the position of the printed symbol mark, the film pressure plate is switched to a film pressure plate position suitable for the film associated with the symbol mark.

Thus, there is no need that the handler for the film pressure plate manually switching is a push button switch, and the handler is not restricted in type.

Figure 20:
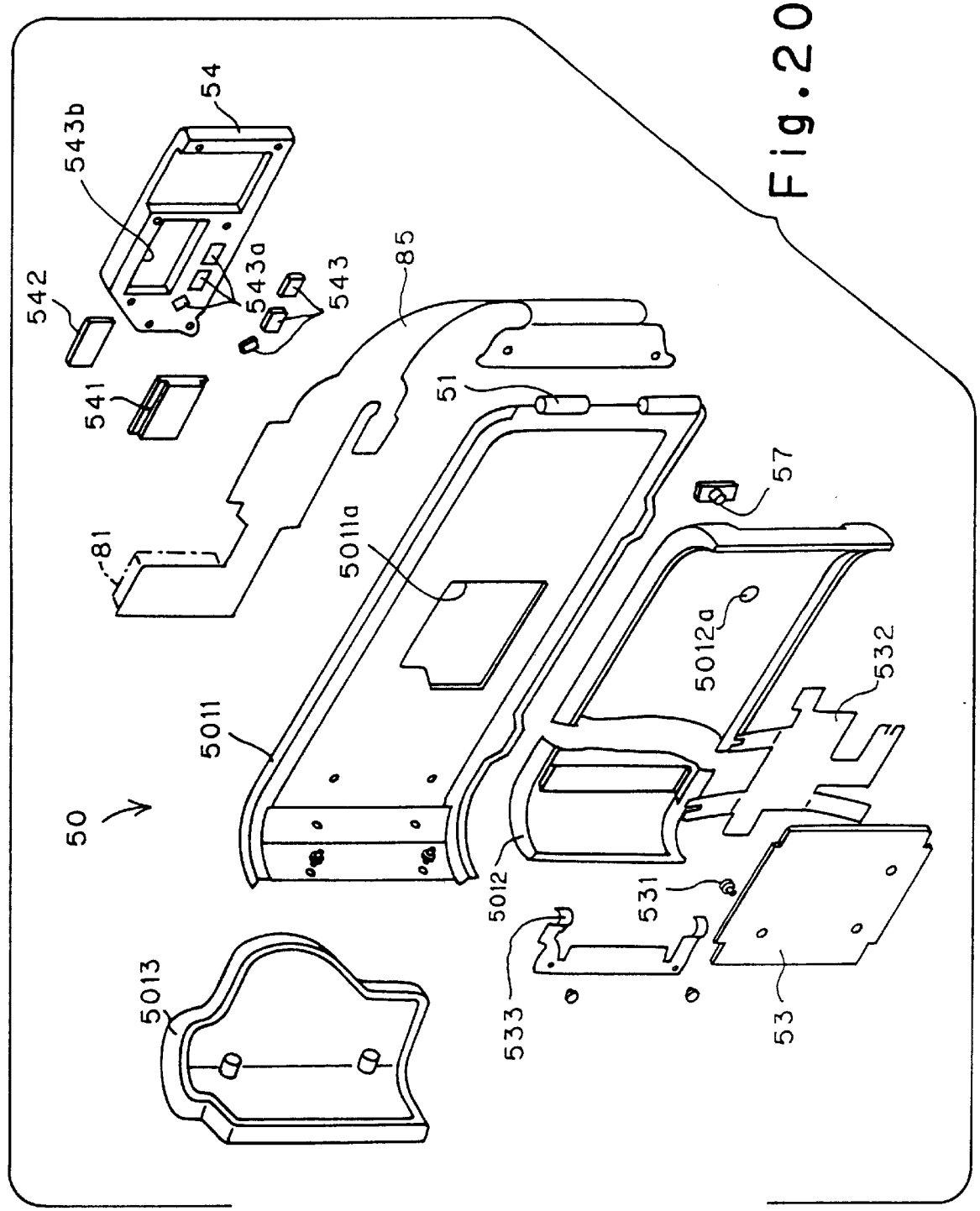
FIG. 20 is an exploded perspective view of the rear cover.

FIG. 20 is an exploded perspective view of the rear cover.

The rear cover 50 comprises a rear cover outer frame 5011, a rear cover inner frame 5012, a rear cover grip member 5013, an LCD frame 54, etc.

Fixed on the rear cover inner frame 5012 are a film pressure plate spring 532 and a counter presser bar plate 533. The film pressure plate 53 is mounted on the rear cover inner frame 5012 by an engagement of the film pressure plate pin 531 with the film pressure plate spring 532 established on the film pressure plate 53. The rear cover inner frame 5012 is provided with an aperture 5012a on which the film pressure plate manually switching button 57 is disposed.

The rear cover outer frame 5011 is also provided with an aperture 5011a. An EL use flexible substrate 85, which couples an El electrical component 81 for an LCD drive display control to a circuit of the camera main frame (not illustrated), enters from the camera main frame side through the hinge 51 side of the rear cover outer frame 5011 between the rear cover inner frame 5012 and the rear cover outer frame 5011, and turns in the outside of the rear cover outer frame 5011 through the aperture 5011a of the rear cover outer frame 5011. The El electrical component 81 is disposed on the outer wall side of the rear cover outer frame 5011.

An arrangement position of the El electrical component 81 of the rear cover outer frame 5011 is covered with the rear cover grip member 5013.

It is preferable that the El electrical component 81 is of a relatively large size, and is disposed in the vicinity of the LCD 541. Here, the El electrical component 81 is disposed inside the rear cover grip member 5013. This satisfies these requirements.

The LCD frame 54 has three apertures 543a and additional one aperture 543b. Three LCD push buttons 543 for performing a display switching of the LCD 541 are fitted into the three apertures 543a, respectively. The LCD 541 and an LCD window are fitted into the additional apertures 543b. Thus assembled LCD frame 54 is fixed on the portion of the aperture 5011a of the rear cover outer frame 5011.

Figure 21:
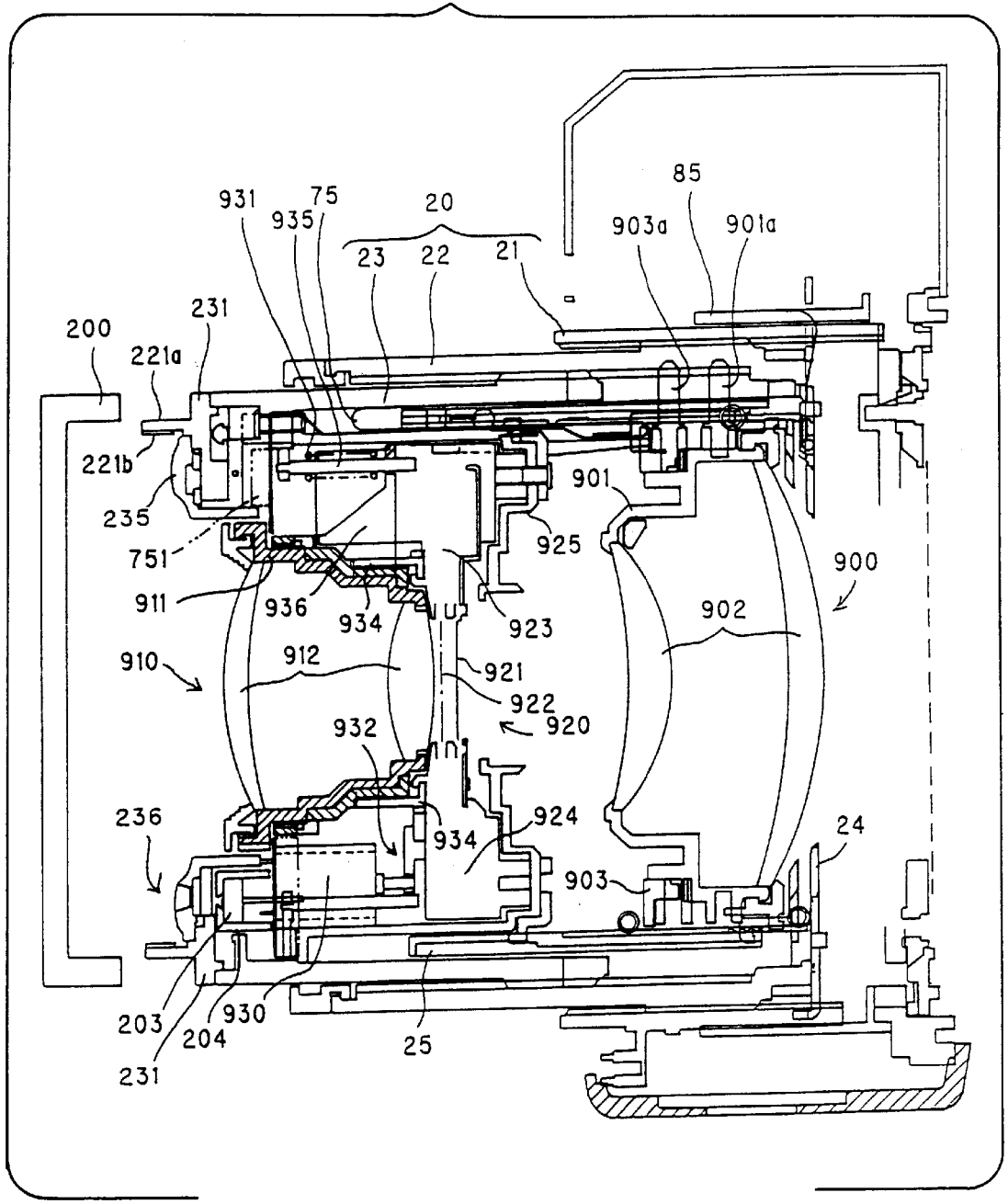
FIG. 21 is an internal constitution view of zoom lens which is installed in the camera according to the present embodiment.

FIG. 21 is an internal constitution view of zoom lens which is installed in the camera according to the present embodiment.

This zoom lens comprises: a lens barrel 20 comprising a fixed cylinder 21 held on a holding member 85, a rear cylinder (intermediate ring) 22 and a front cylinder (moving cylinder) 23; a photographic lens rear elements section 900 comprising rear lenses 902 held by rear elements holding frame 901; a photographic lens front elements section 910 comprising front lenses 912 held by front elements holding frame 911; a shutter 920 comprising aperture blades 921, a sector blade 922, an aperture actuator 923 for driving the aperture blades 921, and a sector actuator 924 for driving the sector blade 922; a lens drive motor 930 for driving the photographic lens front elements section 910, etc.

The photographic lens front elements section 910 is energized by a compression spring 931 in a stand-by direction to contribute to preventing looseness. When the lens drive motor 930 rotates, the driving force is transmitted through a lens driving gear train 932 to a cam 934 so that the cam 934 rotates. When the cam 934 rotates, the photographic lens front elements section 910 travels forward (left in FIG. 20) by a guidance a guide shaft 935 and a guide frame 936. When the lens drive motor 930 reversibly rotates, the photographic lens front elements section 910 returns to the stand-by position.

The shutter 920 is held within a shutter frame 925. The aperture actuator 923 and the sector actuator 924, which constitute the shutter 920, is connected via the flexible print substrate 75 for the shutter to the circuit of the camera main frame side. A mounting component 751 is disposed on the tip of the flexible print substrate 75 for the shutter. The aperture blades 921 of the shutter 920 is adjustable with respect to only the discrete aperture diameter of units of ½ step except the open aperture diameter and the minimum aperture diameter.

A filter ring 231 is fixed on the tip of the front cylinder (moving cylinder) 23. In front of the filter ring 231, there is disposed a decorative ring 235 for covering a part of the filter ring 231. The filter ring 231 is covered with a circular lens cap 200 which is supported by an outer wall 221a of the filter ring 231. On an inner wall 221b of the filter ring 231 there is formed a screw which engages with a screw formed on the periphery of a photographic filter (not illustrated) so that a desired photographic filter can be mounted.

As shown in FIG. 21, there is provided a photometry—use of cap sensor 203 for detecting presence of the lens cap between the filter ring 231 and the photographic lens front elements section 910. The cap sensor 203 is held in a sensor holder 204 which is fixed on the shutter 920. In front of the cap sensor 203, there is formed a photometry—use of window 236 to measure the brightness of external light. With respect to the detection of the presence of the lens cap 200 using the cap sensor 203, there will be described later.

According to the present embodiment, the presence of the lens cap 200 is detected in accordance with the measurement of the brightness of external light. Thus, the attachment of the photographic filter brings about no problem as to the detection of the lens cap 200, different from a case where there is adopted a mechanical switch for detecting the attachment of the lens cap 200. The cap sensor 203 is provided within the lens barrel, and according to the present embodiment, it is permitted as the lens cap 200 to use a circular one but not deformed one, and thus it is preferable from the view point of design.

Figure 22:
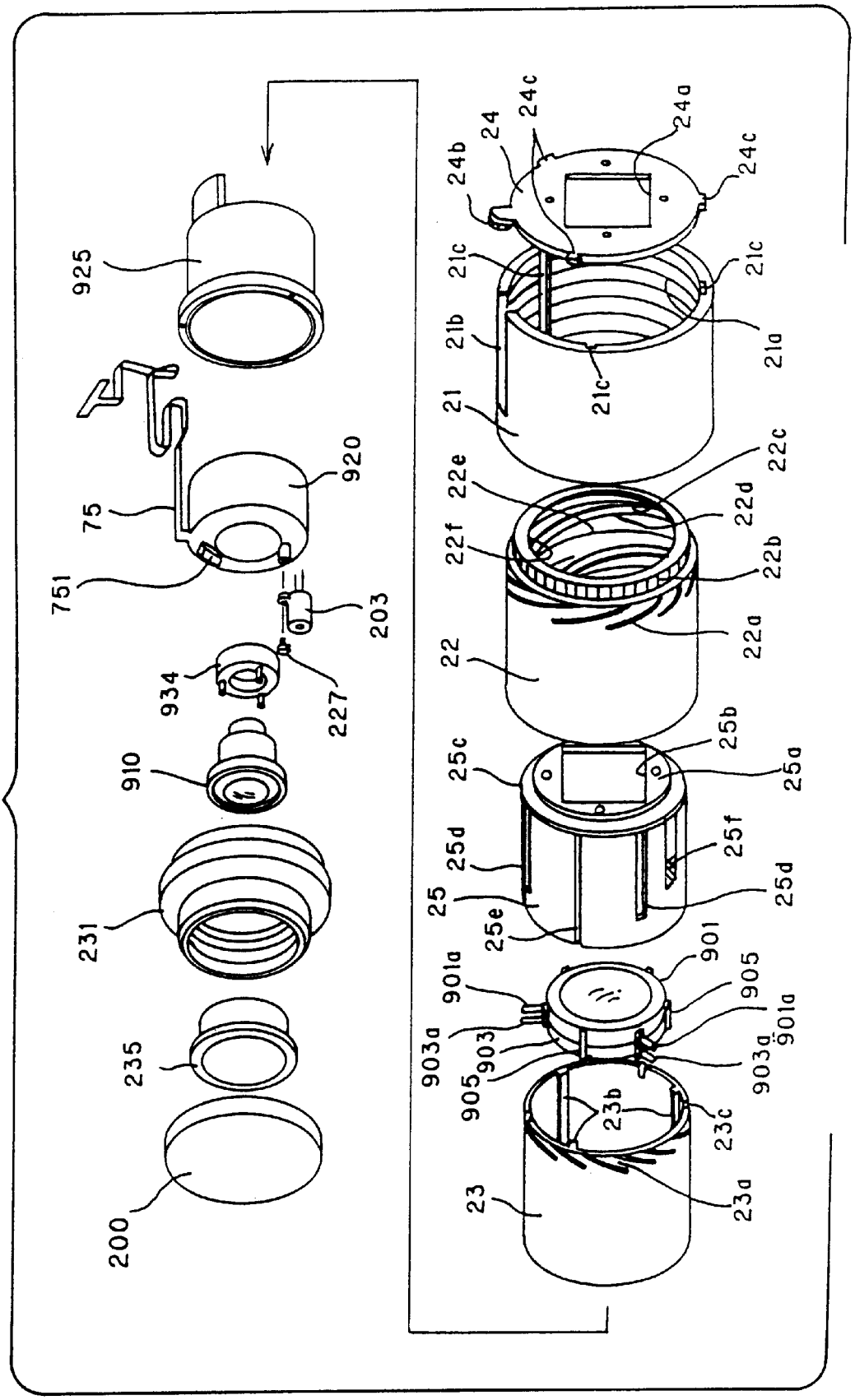
FIG. 22 is an exploded perspective view of the zoom lens.

FIG. 22 is an exploded perspective view of the zoom lens.

In the inner wall of the fixed cylinder 21 fixed on the holding member 85 (cf. FIG. 21), there is a helicoid screw 21a which engages with a helicoid screw 22a formed on an outer wall of the rear cylinder 22. Further, on the fixed cylinder 21, there are formed a vertical opening 21b passing through the inner wall and the outer wall and extending in the optical axis direction, and a key groove 21c extending in the optical axis direction on the inner wall.

A key plate 24 has an aperture 24a at its center portion, and a transmission gear 24b and three projections 24c on its periphery. The key plate 24 is disposed inside of the fixed cylinder 21 in such a state that the transmission gear 24b is engaged with the vertical opening 21b of the fixed cylinder 21, and the three projections 24c are engaged with the key groove 21c to inhibit the key plate 24 from turning. The transmission gear 24b of the key plate 24 is coupled with the lens barrel driving gear train 72 (cf. FIG. 5) which is provided on the camera main frame.

The rear cylinder (intermediate helicoid) 22 has in addition to the above-mentioned helicoid screw 22a a gear 22b formed on the periphery of the rear edge portion, two cam grooves 22c, 22d formed in parallel to one another on the inner wall, a helicoid screw 22e, and a projecting ring 22f formed on the inner periphery of the rear portion opening of the rear cylinder 22.

The rear cylinder 22 is disposed inside the fixed cylinder 21 in such a state the helicoid screw 22a formed on the periphery of the rear cylinder 22 is engaged with the helicoid screw 21a, and the gear 22b formed on the periphery of the rear edge portion of the rear cylinder 22 is engaged with the transmission gear 24b of the key plate 24 within the fixed cylinder 21.

A key ring 25 has an aperture 25b, which is similar in the shape to the aperture 24a of the key plate 24, at a rear edge surface 25a, a projection ring 25c on the periphery on the rear portion, three straight grooves 25d passing through the inner wall and the outer wall and extending in the optical axis direction, three key grooves 25e each having a recess-like configuration, and an encode contact segment 25f which is in contact with an encode plate 23c which will be described later.

A rear elements holding frame 901 incorporating therein the rear lenses 902 (cf. FIG. 21) has three cam pins 901a around the periphery of the rear elemnets holding frame 901. Adjacent to the rear elements holding frame 901, there is disposed a rear elements guide 903 having three cam pins 903a in a similar fashion to that of the three cam pins 901a in such a state that the rear elements guide 903 and the rear elements holding frame 901 attract one another by three pull springs. Those rear elements guide 903 and the rear elements holding frame 901 are arranged within the key ring 25 in such a manner that cam pins 901a and 903a pass through the straight grooves 25d of the key ring 25. The key ring 25 causes the aperture 25b of the rear edge surface 25a and the aperture 24a of the key plate 24 to coincide with each other, so that the rear edge surface 25a and the key plate 24 are fixed on one another by a screw. At that time, there is provided such a state that the projecting ring 22f, which is formed on the inner periphery of the rear portion opening of the rear cylinder 22, is rotatably sandwiched by the key plate 24 and the projection ring 25c on the periphery in the rear portion of the key ring 25. The cam pins 901a and 903a of the rear elements holding frame 901 and the rear elements guide 903 are engaged with the two cam grooves 22c and 22d formed in parallel to one another on the inner wall, respectively, passing through the straight grooves 25d. It is noted that pairs of the cam grooves 22c and 22d are formed with three sets of pair in view of the fact that pairs of the cam pins 901a and 903a are of three sets.

The front cylinder 23 has a helicoid screw 23a on the rear end of the periphery, three projecting members 23b extending in the optical axis direction on the inner wall, and an encode plate 23c on the inner wall. The encode plate 23c is formed with a conductor pattern so that the encode contact segment 25f may detect that the front cylinder 23 reaches the specified four reference positions. The front cylinder 23 enters between the inner wall of the rear cylinder 22 and the outer wall of the key ring 25 disposed inside the rear cylinder 22, so that the helicoid screw 23a engages with the helicoid screw 22e on the inner wall of the rear cylinder 22, and the three projecting members 23b inside the front cylinder 23 slidably engages with the three key grooves 25e on the outer wall of the key ring 25. Further, the encode plate 23c engages with the encode contact segment 25f.

When the lens barrel driving motor 71 shown in FIG. 5 rotates to transmit a driving force via the lens barrel driving gear train 72 to the driving gear 24b of the key plate 24, the driving force is transmitted to the gear 22b of the rear cylinder 22. According to the present embodiment, with respect to the key plate 24, the projections 24c are engaged with the key grooves 21c of the fixed cylinder 21, and the key ring 25 is fixed on the key plate 24. Thus, these key plate 24 and the key ring 25 are inhibited from rotating with respect to the fixed cylinder 21. Consequently, since the helicoid screw 22a on the periphery of the rear cylinder 22 is engaged with the helicoid screw 21a on the inner periphery of the fixed cylinder 21, when the rear cylinder 22 rotates, the rear cylinder 22 moves in the optical axis direction.

At that time, since projecting ring 22f on the inner periphery of the rear end aperture of the rear cylinder 22 is sandwiched between the projecting ring 25c of the key ring 25 and the key plate 24, the key plate 24 and the key ring 25 moves in the optical axis direction, as the rear cylinder 22 moves in the optical axis direction while it rotates.

Further, the rear elements holding frame 901 and the rear elements guide 903 are inhibited from turning, since the cam pins 901a and 903a pass through the straight grooves 25d. And, the rear elements holding frame 901 and the rear elements guide 903 move in the optical axis direction according to turning of the rear cylinder 22 and a movement of the rear cylinder 22 in optical axis direction caused by turning of the rear cylinder 22, since the cam pins 901a and 903a enter into the cam grooves 22c and 22d of the rear cylinder 22.

The front cylinder 23 is inhibited from turning, since the projecting members 23b enter into the key grooves 25e on the outer surface of the key ring 25. And the front cylinder 23 moves in the optical axis direction according to turning of the rear cylinder 22 and a movement of the rear cylinder 22 in optical axis direction caused by turning of the rear cylinder 22, since the helicoid screw 23a on the outer surface of the front cylinder 23 engages with the helicoid screw 22a on the inner periphery of the rear cylinder 22. At that time, the encode contact segment 25f is in contact with the encode plate 23c, so that it is detected that the front cylinder 23 advances to the specified four reference positions, as mentioned above.

Further, a shutter frame 925 enters into the front cylinder 23, and a shutter 920 enters into the shutter frame 925. The flexible substrate 75 for the shutter extends from the shutter 920. The front of the flexible substrate 75 for the shutter is fixed on the front of the shutter 920. A mounting component 751 is disposed on the flexible substrate 75 for the shutter. Further, the cap sensor 203 is soldered on the flexible substrate 75, which is fixed on the front of the shutter 920 by a screw 227. In other words, the flexible substrate 75 serves for wiring of the cap sensor 203. This feature makes it possible to avoid the necessity for an especial wiring for the cap sensor, thereby contributing to reduction of the cost.

A cam 934 and the a photographic lens front elements section 910 having the front lenses 912 (cf. FIG. 21) enter inside the shutter 920. These enter into the front cylinder 23. Fixed on the front of the front cylinder 23 are filter ring 231 and the decorative ring 235. The filter ring 231 is capped with the lens cap 200.

As mentioned above, aperture blades 921 of the shutter 920 is adjustable with respect to only the discrete aperture diameter of units of ½ step except the open aperture diameter and the minimum aperture diameter. The reason why this to do so is that the camera according to the present embodiment adopts a shutter in which the aperture blades 921 and the sector blade 922 are separated by the reasons that such a camera is capable of taking a photograph in the aperture-priority mode and thus there is a need to manually determine the aperture first, the camera is capable of extraordinary precision in exposure, and the camera is a medium-format camera in which large blades are adopted. In view of the foregoing, if it is implemented that the aperture diameter is able to be substantially continuously set up optionally but not on a discrete basis such as ½ step, this causes a control for the shutter time to be very complicated, and thus it is impossible to avoid the considerable cost-up and a long term for a development.

In this case, with respect to the zoom lens, as known, when the zoom lens alters in the focal length, an F-number continuously varies even if the mechanical aperture diameter of the aperture blades is constant, and thus it is impossible to implement the aperture-priority and the high precision of exposure in accordance with the conventional camera system.

In view of the foregoing, according to the camera of the present embodiment, there is adopted an electricallypowered zoom in which only the photograph at the discrete four zoom position (the lens barrel extension position) is permitted. This feature makes it possible to load the zoom lens, maintaining the high precision of exposure without increasing the cost. When the aperture is manually set up, an aperture diameter of the aperture blades at the time of the photograph is controlled in accordance with the alteration of the zoom positions so as to ensure the same F-number even if the zoom positions are altered. This control is performed on a discrete basis (according to the present embodiment, units of ½ step) also with respect the aperture diameter, since the zoom positions are discrete.

When the zoom positions are altered, a WIDE/TELE switch (not illustrated) is operated, anyone of the zoom positions permitted only in four points is set up. Before taking the photograph, the lens barrel is extended to the lens barrel stand-by position according to the lens barrel extension position set up, behind the zoom position (lens barrel extension position) thus set up, and the photographic lens front elements section 910 stands by at a predetermined lens stand-by position. In order to take the photograph, the lens barrel is extended from the lens barrel stand-by position to the lens barrel extension position set up, and the photographic lens front elements section 910 is extended from the lens stand-by position to a lens extension position according to the camera-to-subject distance set up (MF(manual focus mode)) or measured (AF(auto focus mode)).

In this manner, both the lens barrel 20 and the photographic lens front elements section 910 are one-sided, and when the photograph is taken, both they are extended. Thus, with respect to both the lens barrel 20 and the photographic lens front elements section 910, the extension position error due to the back-lash of the driving gear, etc. is absorbed, and thus it is possible to perform a focusing with great accuracy.

According to the present embodiment, since the lens barrel is extended from the lens barrel stand-by position associated with the lens barrel extension position set up to the lens barrel extension position set up, there is adopted the following system. That is, when the lens barrel is extended from the lens barrel stand-by position and reaches a predetermined reference position corresponding to the lens barrel extension position set up, it is detected by an effect of the encode plate 23c and the encode contact segment 25f explained with reference to FIG. 22 that the lens barrel reaches the reference position. Thereafter, a point further driven by a predetermined amount (for example, in the event that the film barrel motor 71 (cf. FIG. 5) is driven by pulses, 50 pulse corresponding in the number of pulses) is established as the lens barrel extension position. This feature makes it possible to extend the lens barrel to the lens barrel extension position which is always reliably set up.

Further, as mentioned above, according to the camera of the present embodiment, it is possible to use two types of film of an 120 film and a 220 film, and to maintain the evenness of the films in height by the above-mentioned measure. However, exactly to say, the 120 film and the 220 film get out of position in their actual film surface. For this reason, in the extension of the photographic lens front elements section 910, an amount of film extension is determined taking into consideration not only the zoom position and the camera-to-subject distance, but also the type of the mounted film. In this manner, according to the present embodiment, it is possible to implement a camera with a good performance in focusing.

Further, according to the camera of the present embodiment, it is possible to manually set up the camera-to-subject distance. It is noted, however, that even if the same camera-to-subject distance is set up, an amount of extension of the photographic lens front elements section 910 varies in accordance with the zoom position (lens barrel extension position). In view of the foregoing, in the event that when the MF (manual focus) mode is set up and the lens is extended, the zoom position is altered by an operation of the WIDE/TELE switch (not illustrated), the photographic lens front elements section 910 is returned once to the stand-by position prior to the successive photograph, and then the photographic lens front elements section 910 is extended to the lens extension position associated with the newly set up zoom position. This feature makes it possible to freely alter the zoom position to an optional point of the four points in the MF mode, although the optional points are restricted to the four points.

Further, with respect to the detection of the lens cap 200, it has been explained that the cap sensor 203 disposed within the lens barrel 20 serves as a detector for the lens cap 200. However, it is noted that in order to detect the lens cap 200 there are used not only the photometric value by the cap sensor 203 but also the photometric value by the AE sensor for an exposure control, which is disposed inside the AE window 324 (cf. FIG. 1). That is, according to the present embodiment, an attachment of the lens cap is determined when following relations are satisfied, $LVa <$ the photometric value, and $LVb >$ the second photometric value where $LVa$ denotes a first threshold to be compared with the first photometric value by said first sensor, and $LVb$ denotes a second threshold to be compared with the second photometric value by said second sensor (assuming that $LVa < LVb$). The reason why the relation $LVa < LVb$ is given is that there is a possibility that the photographic filter such as an ND filter is mounted on the filter ring 231, and thus an erroneous detection may be avoided. Specifically, as $LVa$ and $LVb$, LV2 and LV5 are adopted.

Further, it is acceptable that for example, an acceptance angle of the cap sensor 203 is set up broader than that of the AE sensor, and these two sensors different in the acceptance angle are used to detect back light.

Next, there will be explained an operational sequence of the present embodiment.

Figure 23:
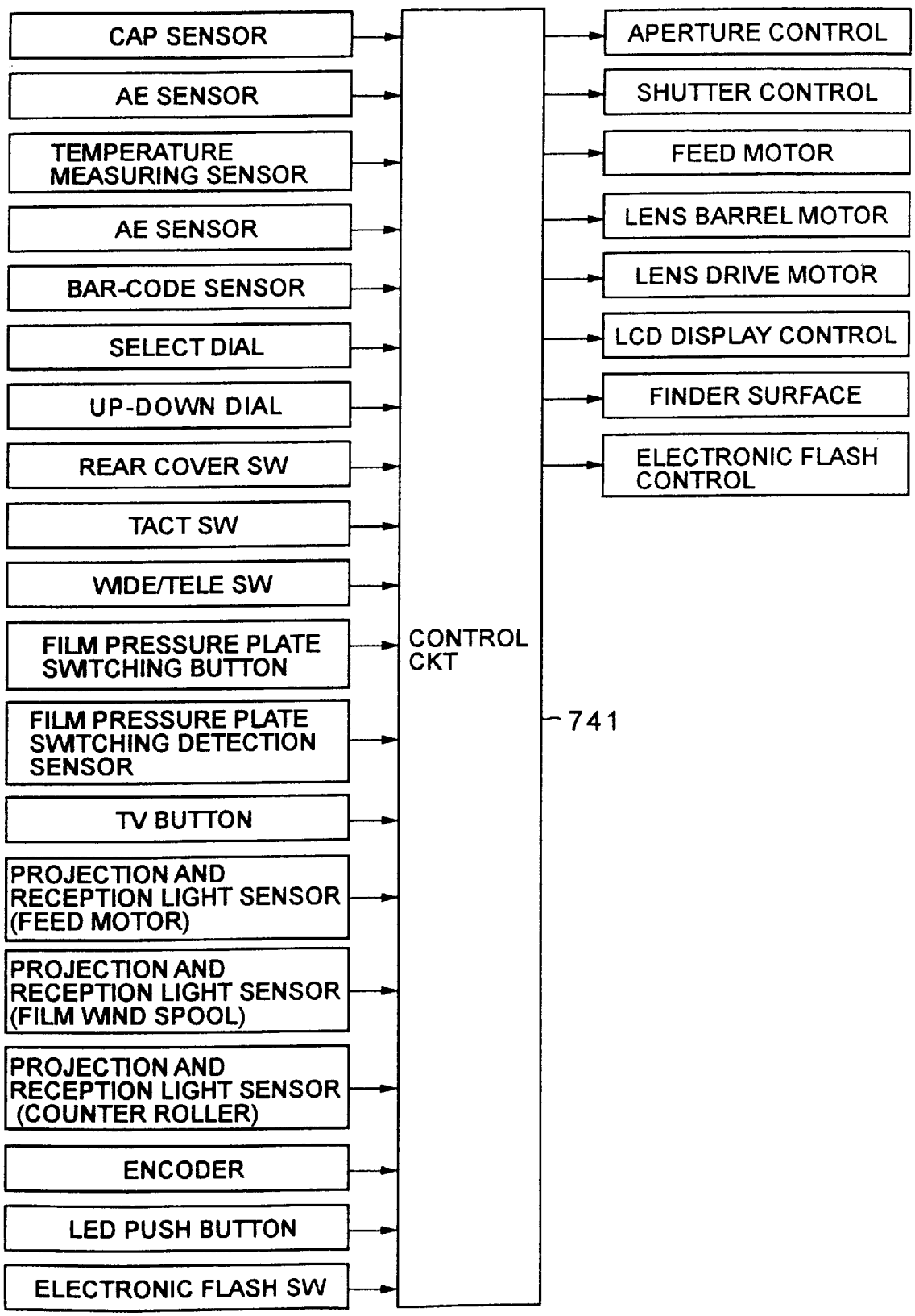
FIG. 23 is a block diagram useful for understanding an outline of the control in the present embodiment.

FIG. 23 is a block diagram useful for understanding an outline of the control in the present embodiment.

A camera according to the present embodiment has a control circuit 741 including a microcomputer. The control circuit 741 receives signals from various type sensors and switches, etc., and controls the respective sections of the camera in accordance with those signals.

Hereinafter, there will be summarized various type sensors and switches, and various control objects of the control circuit 741.

A "cap sensor" corresponds to the cap sensor 203 disposed within the lens barrel. The photometric value of the cap sensor is used for detection of mounting of the lens cap 200, and may be used also for detection of back light.

A "AE sensor" corresponds to the AE sensor for photometry disposed inside the AE window 324 shown in FIG. 1. The photometric value of the AE sensor is used for an exposure control.

A "temperature measuring sensor" is arranged in one united body with the AE sensor. The measured value by the temperature measuring sensor is used for correction of the distance obtained by the auto focus, in accordance with the present embodiment.

An "AF sensor" is disposed inside the AF window 311 showing in FIG. 1, and outputs the focusing value representative of the distance to the camera subject.

A "bar-code sensor" corresponds to the bar-code sensor 76 shown in FIG. 14, and is for reading the bar code 100*d* (cf. FIG. 15) on a photographic film.

A "select dial" corresponds to the select dial 36 shown in FIG. 2, and as mentioned above, is for selecting various photographic modes and the like.

An "up-down dial" corresponds to the up-down dial 37 shown in FIG. 2, and is for increasing or decreasing the film speed, the aperture scaler, etc. in accordance with the mode set up by the select dial 36.

A "rear cover switch" is for detecting a switching of the rear cover 50 (cf. FIG. 18).

A "tact switch" corresponds to the tact switch 341 shown in FIG. 7, and is for detecting a depression of the shutter button 34. The tact switch has a function of detecting a distinction between the half-depression state (SP1) and the complete-depression (SP2).

A "WIDE/TELE switch" is for altering the zoom position to the wide-angle side or the telephoto side. As mentioned above, according to the present embodiment, it is possible to switch the zoom position on a four stage basis. When the WIDE/TELE switch is operated to the wide-angle side, the zoom position is switched to the wide-angle side. On the other hand, when the WIDE/TELE switch is operated to the telephoto side, the zoom position is switched to the telephoto side.

A "film pressure switching button" corresponds to the film pressure plate manually switching button 57 shown in FIG. 18.

A "film pressure switching detection sensor" is, as shown in FIG. 9, for detecting whether the film pressure plate switching pin 64 is in the position projecting from the aperture 652 or in the position sinking inside the aperture 652.

A "Tv button" corresponds to the Tv button 371 shown in FIG. 2. As mentioned above, setting the select dial 36 at the manual mode (M) and turning the up-down dial 37 while the Tv button 371 is depressed makes it possible to alter the shutter speed.

A "light projection and reception sensor (feed motor)" is for detecting light passing trough the encode plate 473 shown in FIG. 6 to generate pulses for detecting the amount of rotation of the feed motor 45.

A "light projection and reception sensor (spool for use in film wind)" is for detecting light passing trough the encode plate 471 shown in FIG. 6 to generate pulses for detecting the amount of rotation of the film wind spool 102 set to the film wind chamber 61 (cf. FIG. 8).

A "light projection and reception sensor (counter roller)" is for detecting light passing trough the encode plate 472 shown in FIG. 6 to generate pulses for detecting the amount of feed of a film.

An "encoder" corresponds to an encoder comprising the encode plate 23*c* provided on the front cylinder 23 shown in FIG. 22 and the encode contact segment 25*f* provided on the key ring 25. The encoder detects that the lens barrel extends to any one of the four reference positions.

An "LCD push button" corresponds to the LCD push button 543 shown in FIG. 20. When the LCD push button 543 is depressed, there are performed not only a display switching to the LCD 541 but also the specific setting to the camera 10.

An "electronic flash switch" is switched according as the electronic flash light emitting unit is in condition for accommodation or in a swing up condition. The electronic flash switch is used to determine whether the photography using the electronic flash is performed.

An "aperture control" is to transmit a control signal to the aperture actuator 923 shown in FIG. 21 to control a diameter of the aperture (F-number) of the aperture blades 921.

A "shutter control" is to transmit a control signal to the sector actuator 924 shown in FIG. 21 to control switching of the sector blade 922.

A "feed motor" is to control the feed motor 45 shown in FIGS. 5 and 6 to perform a feed of a film and a film pressure plate switching.

A "lens barrel motor" is to control the lens barrel motor 71 shown in FIG. 5 to control an extension of the lens barrel.

A "lens drive motor" is to control the lens drive motor 930 shown in FIG. 21 to control an extension of the photographic lens front elements section 910.

A "LCD display control" is to transmit a control signal to the EL electrical component 81 shown in FIG. 8 to control a display for the LCD 541 mounted on the rear cover 50.

With respect to a "finder display control", it is not yet referred to. However, in the camera according to the present embodiment, there is performed a liquid-crystal display for a field frame etc. inside the finder 32 shown in FIG. 2. The "LCD display control" is to control the display in such a finder.

An "electronic flash control" is to control a photography using an electronic flash.

Figure 24:
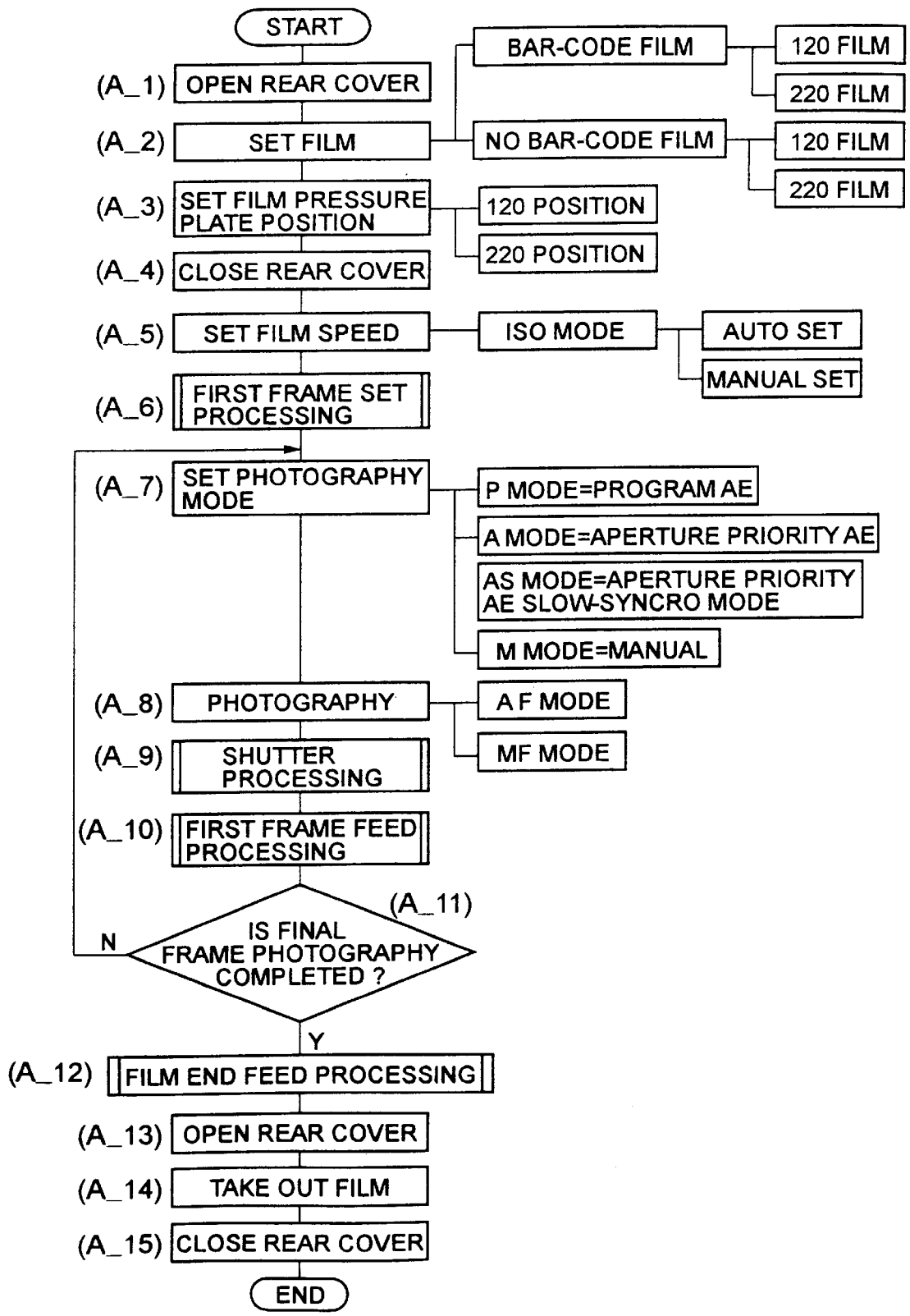
FIG. 24 is a flowchart useful for understanding a basic operation involved in the photography.

FIG. 24 is a flowchart useful for understanding a basic operation involved in the photography.

First, for the purpose of mounting a film, the rear cover is opened (step A_1).

Figure 25:
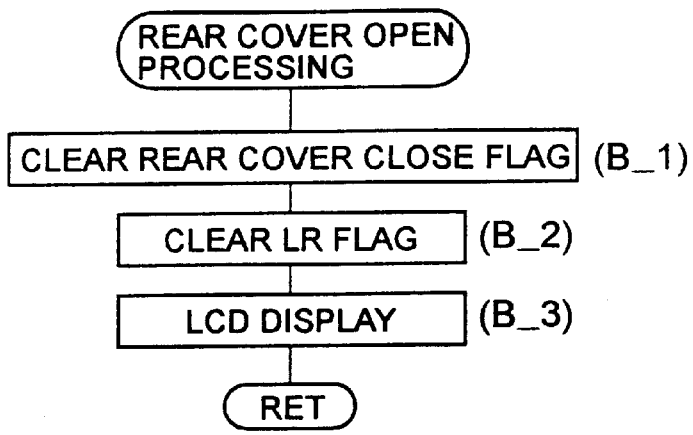
FIG. 25 is a flowchart useful for understanding a rear cover open processing routine.

FIG. 25 is a flowchart useful for understanding a rear cover open processing routine which is operated when the rear cover is opened.

When the rear cover is opened, first, a rear cover close flag is cleared (step B_1), an LR flag is cleared (step B_2), and then an LCD display is altered in a mode in which the rear cover is opened (step B_3). Here, the rear cover close flag is basically indicative of a matter as to whether the rear cover is closed. It is noted that in the shutter process and the like, which will be described later, the rear cover close flag may be cleared even in the state that the rear cover is kept closed. It is determined as to whether a set processing for a first frame of a film is performed in accordance with the rear cover close flag.

The LR flag is indicative of a matter as to whether a photography is performed in the MF (manual focus) mode, the photographic lens front elements section 910 (cf. FIG. 21) is now kept extended, and the amount of extension is to be altered.

In the step A_2 in FIG. 24, a photographic film is set up. With respect to the film used here, there are two types of film one of which has a bar code, another having no bar code. And regarding each of these type films, a 120 film and a 220 film exist. In the step A_3, the classification (120 film or 220 film) of the film is selected by film pressure plate manually switching button 57 (cf. FIG. 18) provided inside the rear cover. This operation is effective only in case of the film having no bar code. In case of the film having the bar code, the classification of the film obtained through reading the bar code has priority.

In the event that the film having no bar code is mounted, and the rear cover is closed without switching by the film pressure plate manually switching button 57 to the proper film pressure plate position, dialing the up-down dial 36 (cf. FIG. 2) while pushing the DATA button (one of three LCD push buttons 543 shown in FIG. 20) makes it possible to perform the same switching as that by the film pressure plate manually switching button 57. When the bar code film is mounted to read the bar code, this operation is inhibited.

In the step A__4 in FIG. 24, the rear cover is closed.

Figure 26:
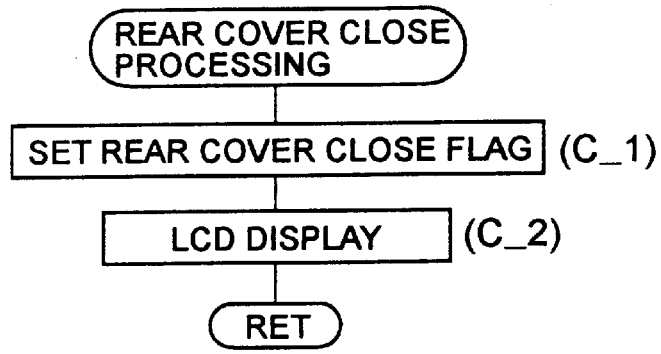
FIG. 26 is a flowchart useful for understanding a rear cover close processing routine.

FIG. 26 is a flowchart useful for understanding a rear cover close processing routine which is operated when the rear cover is closed.

Here, the rear cover close flag is set (step C__1), so that the LCD display mode is altered (step C__2).

In step A__5 in FIG. 24, the film speed is set up.

Setting of the film speed is implemented in such a manner that the select dial 36 shown in FIG. 2 is dialed to establish the ISO mode, and the up-down dial 37 is dialed. The film speed thus set up is displayed on the LCD of the rear cover. This indication is changed by dialing the up-down dial 37 in such a manner as "AUTO"→"25"→"50"→ . . . →"1600". When the "AUTO" is set, in case of the bar code film, the film speed is automatically set up to the speed read from the bar code. When any one of "25"–"1600" is set, the film speed manually set is available as it is, even in case of the bar code film.

In step A__6 in FIG. 24, a first frame set processing is performed. There are two ways of timing in which the first frame set processing is performed, one of which is a timing in which in the state that the select dial 36 shown in FIG. 2 is set to any one of P, A, As, and M, a film is mounted and the rear cover is closed, and thereafter the shutter button 34 is pushed first, and another is a timing in which in the state that the select dial 36 shown in FIG. 2 is set to the "OFF", a film is mounted and the rear cover is closed, and thereafter the select dial 36 shown in FIG. 2 is set to any one of P, A, As, and M.

In the first frame set processing, the first frame of the film mounted is wound to the position on the photographic lens optical axis.

In step A__7 in FIG. 24, a photographic mode is set up. The select dial 36 is dialed to set up the photographic mode. The various photographic modes have been explained above. Thus, redundant explanation will be omitted.

In step A__8 in FIG. 24, a photographic operation is performed. The photographic operation includes an operation for setting the camera-to-subject distance in the MF (manual focus) mode, and an operation for altering the focal length of the zoom lens by the WIDE/TELE switch.

Figure 27:
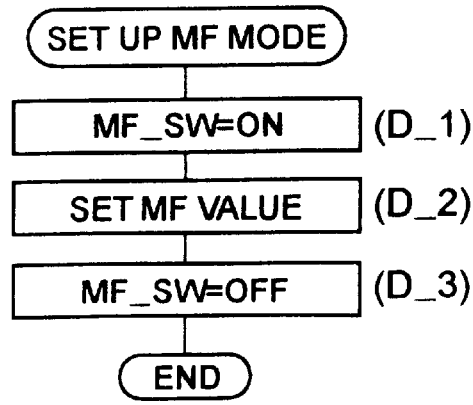
FIG. 27 is a flowchart useful for understanding a manual focus (MF) set up routine.

FIG. 27 is a flowchart useful for understanding a manual focus (MF) set up routine.

First, in step D__1, a manual focus switch (MF__SW) is depressed. This MF__SW is one of the three LCD push buttons 543 shown in FIG. 20.

In step D__2, the camera-to-subject distance is set up by dialing the up-down dial 37 (cf. FIG. 2) in the state that the MF__SW is kept on depression.

At that time, the indication of the LCD 541 is changed in such a manner as "AF"→"INF"→"20 m"→"10 m"→ . . . →"1.2 m"→"1.1 m"→"1.0 m". When the "AF" is set, the auto focus (AF) mode is established. When any one of the remaining indications is set, the manual focus (MF) is established to set the indicated camera-to-subject distance. In step D__3, when the MF__SW is released, the camera-to-subject distance is settled.

Figure 28:
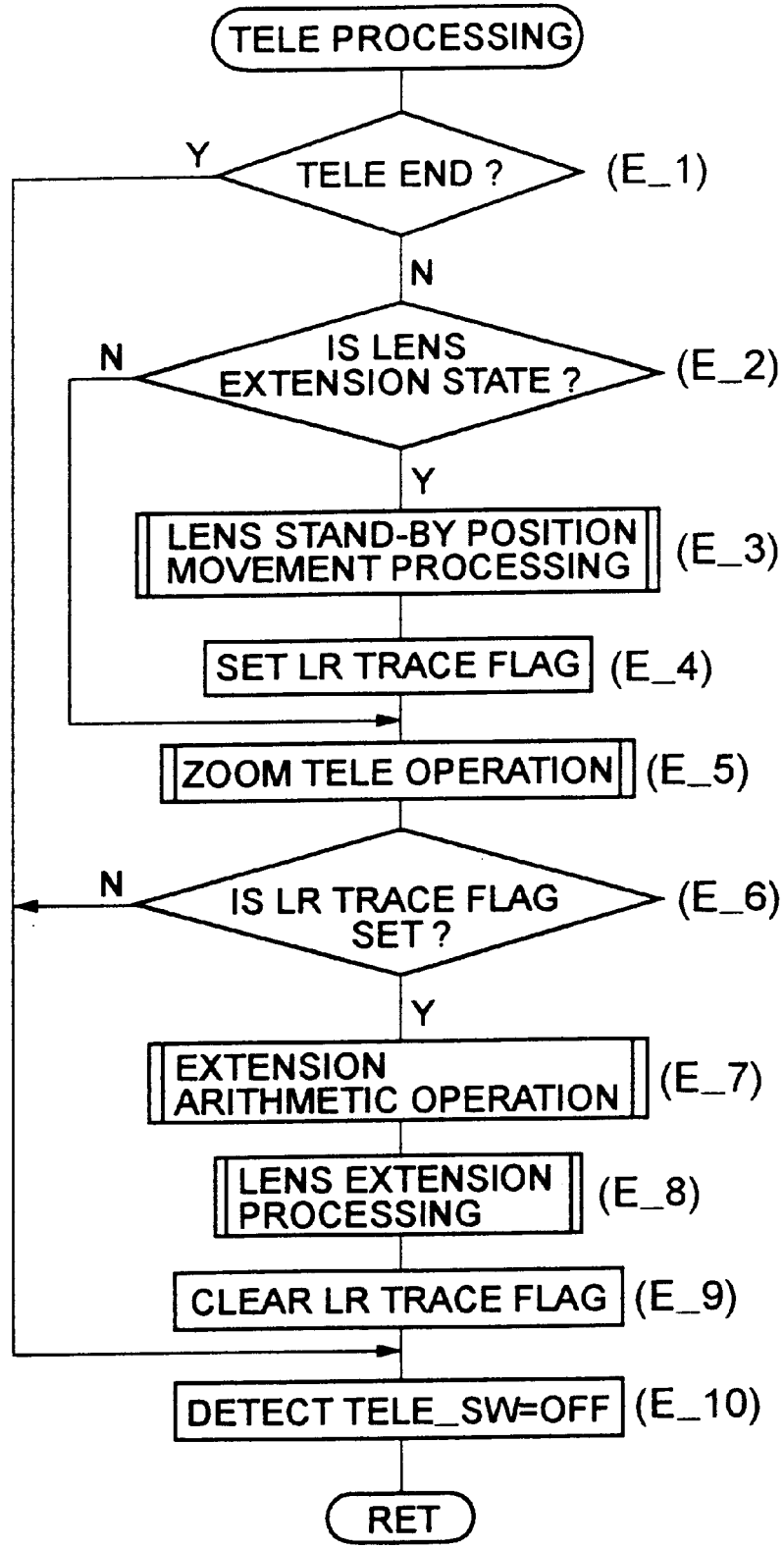
FIG. 28 is a flowchart useful for understanding a TELE processing routine which is executed when the WIDE/TELE switch is selected to the TELE side.

FIG. 28 is a flowchart useful for understanding a TELE processing routine which is executed when the WIDE/TELE switch is selected to the TELE side.

First, in step E__1, it is determined whether the present zoom position is in the telephoto side. When it is decided that the zoom position is already in the telephoto side, the process directly goes to step E__10, and when the WIDE/TELE switch is released from selection of the telephoto side in operation, this routine is passed through.

In step E__1, when it is decided that the WIDE/TELE switch is not in the TELE side, the process goes to step E__2 in which it is determined whether the lens (the photographic lens front elements section 910) is extended. In the MF mode, when the photographic lens front elements section 910 is extended once, it maintains the state extended until there occurs the necessity for an alteration of the amount of extension. Here, there occurs an alteration in the amount of extension in accordance with an alteration of the zoom position.

In step E__2, when it is decided that the lens has been extended, the process goes to step E__3 in which the lens (the photographic lens front elements section 910) is moved once to the stand-by position. In step E__4, there is set an LR trace flag representative of the matter that the lens had been extended.

In step E__5, the zoom is translated to the telephoto side. In the step E__2, when it is decided that the lens has not been extended, the process directly goes to step E__5 skipping steps E__3 and E__4.

Figure 29:
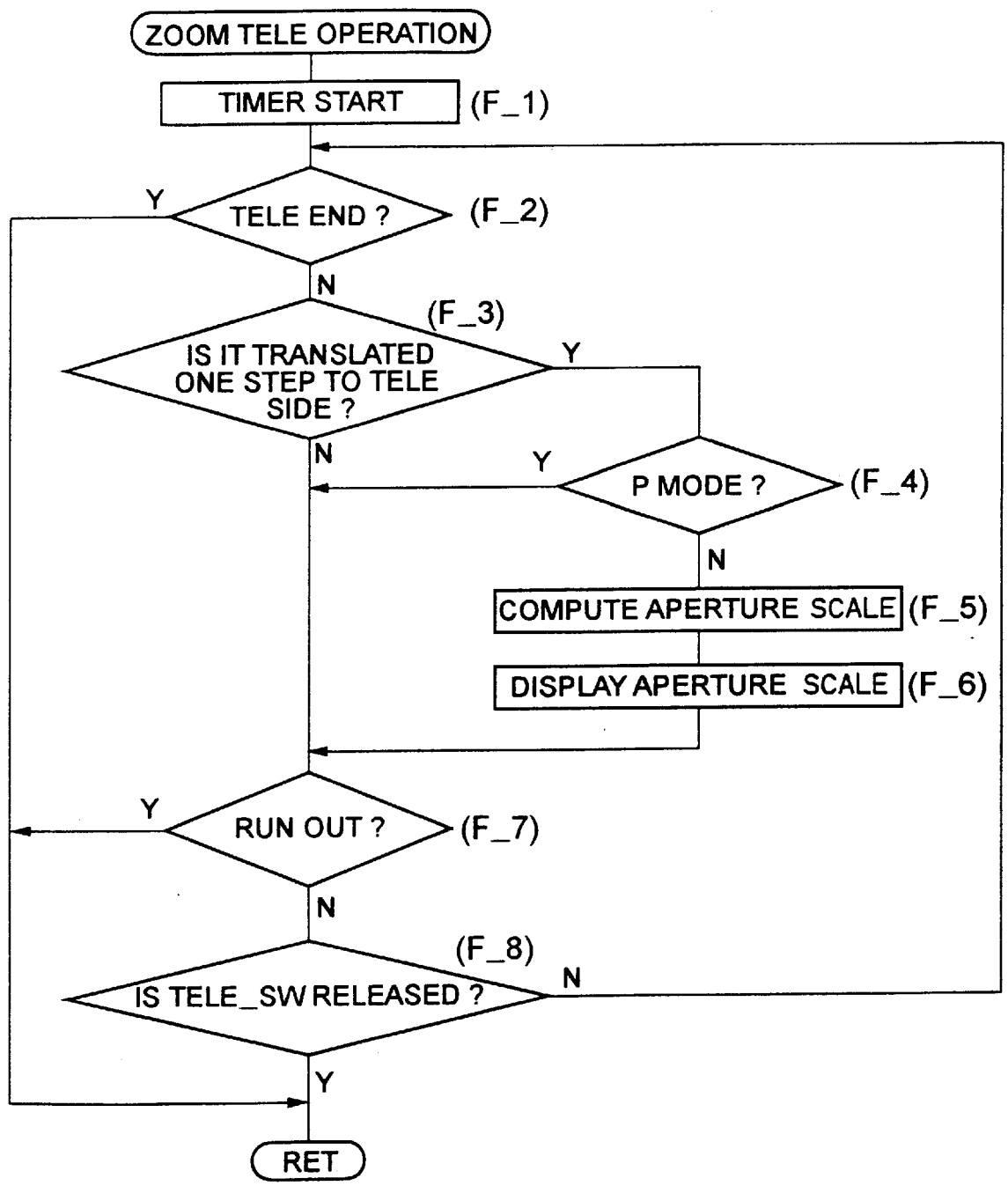
FIG. 29 is a flowchart useful for understanding a zoom TELE operation routine.

FIG. 29 is a flowchart useful for understanding a zoom TELE operation routine which is executed in the step E__5 in FIG. 28.

Here, first, the timer is activated to start a counting of time sufficient for a zoom operation, for example, 3 sec. (step F__1).

Next, in step F__2, it is determined whether the zoom reaches the telephoto end. When it is decided that the lens does not reaches the telephoto end, the process goes to step F__3 in which it is determined whether the zoom moves by one step to the telephoto side. When a translation of the zoom to the telephoto side one step is not yet completed, the process directly goes to step F__7. When it is decided that the zoom moves by one step to the telephoto side, the process goes to step F__4 in which it is determined whether the P mode (program mode) is set. When the P mode is set, the process goes to step F__7. When another mode but the P mode, that is, any one of the A mode, the As mode, and the M mode, is set, the process goes to step F__5 in which a computation of an aperture scaler is performed, and then the process goes to step F__6 in which a display of the aperture scaler on the LCD of the rear cover is performed. A method of computing the aperture scale (F-number) will be described later.

In step F__7, it is determined whether the timer enabled in the step F__1 runs out. When the timer runs out, this routine is passed through. If not, the process goes to step F__8 in which it is determined whether the operation of the WIDE/TELE switch to the TELE side is over. When the operation still continues, the process returns to step F__2. When the switch operation is over, this routine is passed through.

In step E__6 in FIG. 28, it is determined whether the LR trace flag is set. When the LR trace flag is set, the process goes to step E__7 in which an arithmetic operation for the amount of extension of the lens associated with the zoom position newly set in the step E__5 is carried out. A method of the arithmetic operation for the amount of extension of the lens will be described with reference to the shutter processing (cf. FIG. 33) which will be described later.

In step E__8, the less (the photographic lens front elements section 910) is extended to the lens extension position suitable for the new zoom position. In step E__9, the LR trace flag is cleared.

In step E__10, it is detected that the operation of the WIDE/TELE switch to the TELE side is over, and this routine is passed through.

In step E__6, when it is decided that the LR trace flag is not set, the process directly goes to the step E__10.

Incidentally, according to the TELE processing shown in FIG. 28, in the event that the zoom position is altered in the state that the lens is extended in the MF mode, the lens is once returned to the stand-by position (step E__3) before the amount of extension of the lens barrel is altered (step E__5). However, it is acceptable that this order is reversed. That is, it is acceptable that after the amount of extension of the lens barrel is altered, the lens is returned to the stand-by position.

Figure 30:
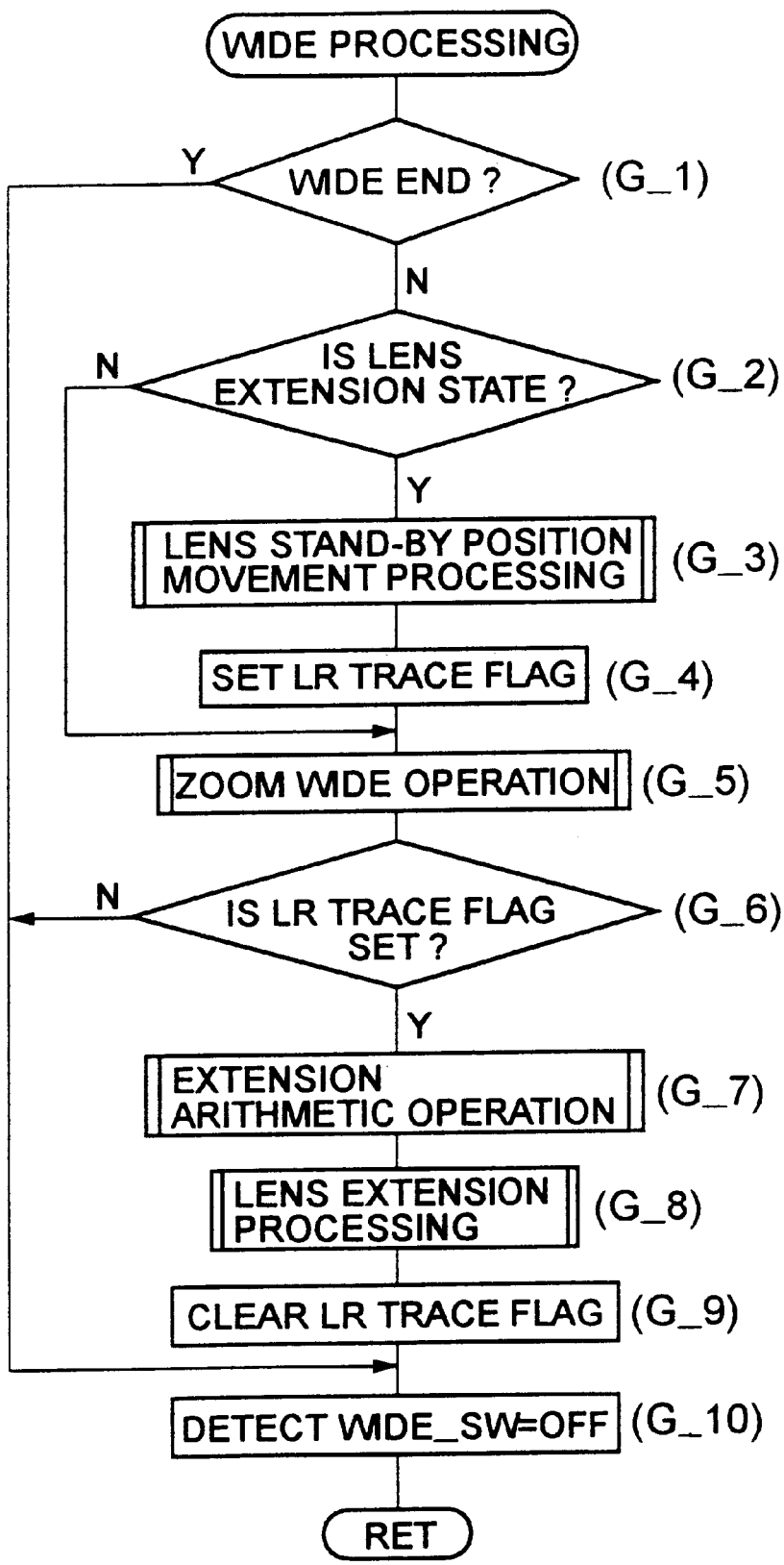
FIG. 30 is a flowchart useful for understanding a WIDE processing routine which is executed when the WIDE/TELE switch is selected to the WIDE side.

FIG. 30 is a flowchart useful for understanding a WIDE processing routine which is executed when the WIDE/TELE switch is selected to the WIDE side. This routine is the same as the TELE processing routine shown in FIG. 28, except for that the zoom position is altered to the wide side.

First, in step G__1, it is determined whether the zoom position is now in the edge of the wide side. When it is decided that the zoom position is already in the edge of the wide side, the process directly goes to step G__10, and this routine is passed through when the operation of the WIDE/TELE switch to the TELE side is over.

In step G__1, when it is decided that the zoom position is not in the edge of the wide side, the process goes to step G__2 in which it is determined that the less (the photographic lens front elements section 910) has been extended. As mentioned above, in the MF (manual focus) mode, when the photographic lens front elements section 910 is once extended, this state is maintained until there occurs a need to alter the amount of extension. Here, there occurs a need to alter the amount of extension, when the zoom position is altered.

In step G__2, when it is decided that the lens is in the state of extension, the process goes to step G__3 in which less (the photographic lens front elements section 910) is once moved in the stand-by position, and then the process goes to step G__4 in which LR trace flag indicative of the matter that the lens is extended is set.

In step G__5, the zoom is translated to the wide side. In step G__2, when it is decided that the lens is not extended, or the lens is in the stand-by position, the process directly goes to step G__5 skipping steps G__3 and G__4.

Figure 31:
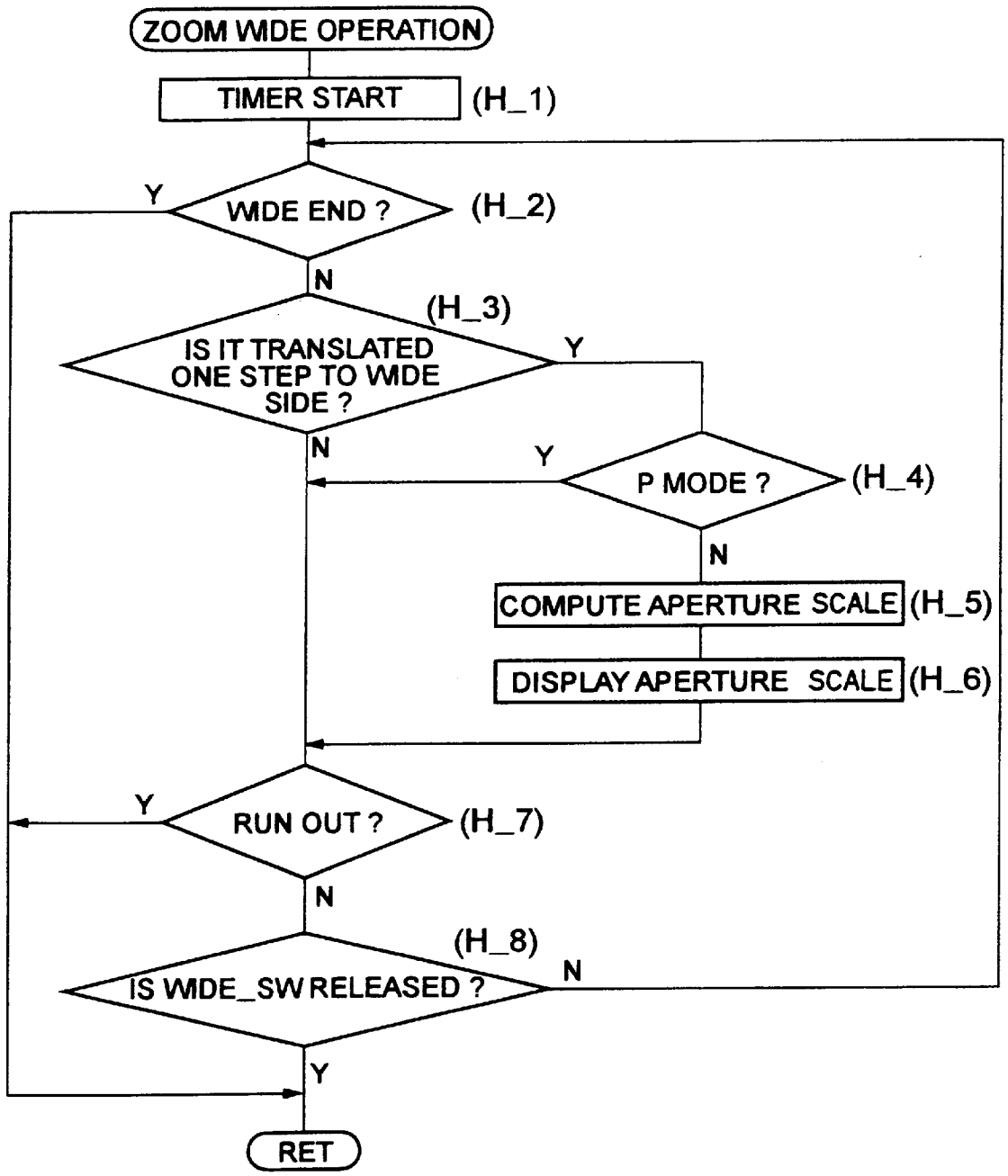
FIG. 31 is a flowchart useful for understanding a zoom WIDE operation routine.

FIG. 31 is a flowchart useful for understanding a zoom WIDE operation routine which is executed in step G__5 in FIG. 30. This routine is also the same as the zoom TELE operation routine shown in FIG. 29 except for a difference in operation between the wide side and the telephoto side.

Here, first, the timer is activated to start a counting of time sufficient for a zoom operation, for example, 3 sec. (step H__1).

Next, in step H__2, it is determined whether the zoom reaches the wide end. When it is decided that the lens does not reaches the wide end, the process goes to step H__3 in which it is determined whether the zoom moves by one step to the wide side. When a translation of the zoom to the wide side one step is not yet completed, the process directly goes to step H__7. When it is decided that the zoom moves by one step to the wide side, the process goes to step H__4 in which it is determined whether the P mode (program mode) is set. When the P mode is set, the process goes to step H__7. When another mode but the P mode, that is, any one of the A mode, the As mode, and the M mode, is set, the process goes to step H__5 in which a computation of an aperture scale (F-number) is performed, and then the process goes to step F__6 in which a display of the aperture scale on the LCD of the rear cover is performed. A method of computing the aperture scale will be described later.

In step H__7, it is determined whether the timer enabled in the step H__1 runs out. When the timer runs out, this routine is passed through. If not, the process goes to step H__8 in which it is determined whether the operation of the WIDE/TELE switch to the WIDE side is over. When the operation still continues, the process returns to step H__2. When the switch operation is over, this routine is passed through.

In step G__6 in FIG. 28, it is determined whether the LR trace flag is set. When the LR trace flag is set, the process goes to step G__7 in which an arithmetic operation for the amount of extension of the lens associated with the zoom position newly set in the step G__5 is carried out. A method of the arithmetic operation for the amount of extension of the lens will be described with reference to the shutter processing (cf. FIG. 33) which will be described later.

In step G__8, the less (the photographic lens front elements section 910) is extended to the lens extension position suitable for the new zoom position. In step G__9, the LR trace flag is cleared.

In step G__10, it is detected that the operation of the WIDE/TELE switch to the WIDE side is over, and this routine is passed through.

In step G__6, when it is decided that the LR trace flag is not set, the process directly goes to the step G__10.

Incidentally, according to the WIDE processing shown in FIG. 30, in the event that the zoom position is altered in the state that the lens is extended in the MF mode, the lens is once returned to the stand-by position (step G__3) before the amount of extension of the lens barrel is altered (step G__5). However, it is acceptable that this order is reversed. That is, it is acceptable that after the amount of extension of the lens barrel is altered, the lens is returned to the stand-by position.

Figure 32:
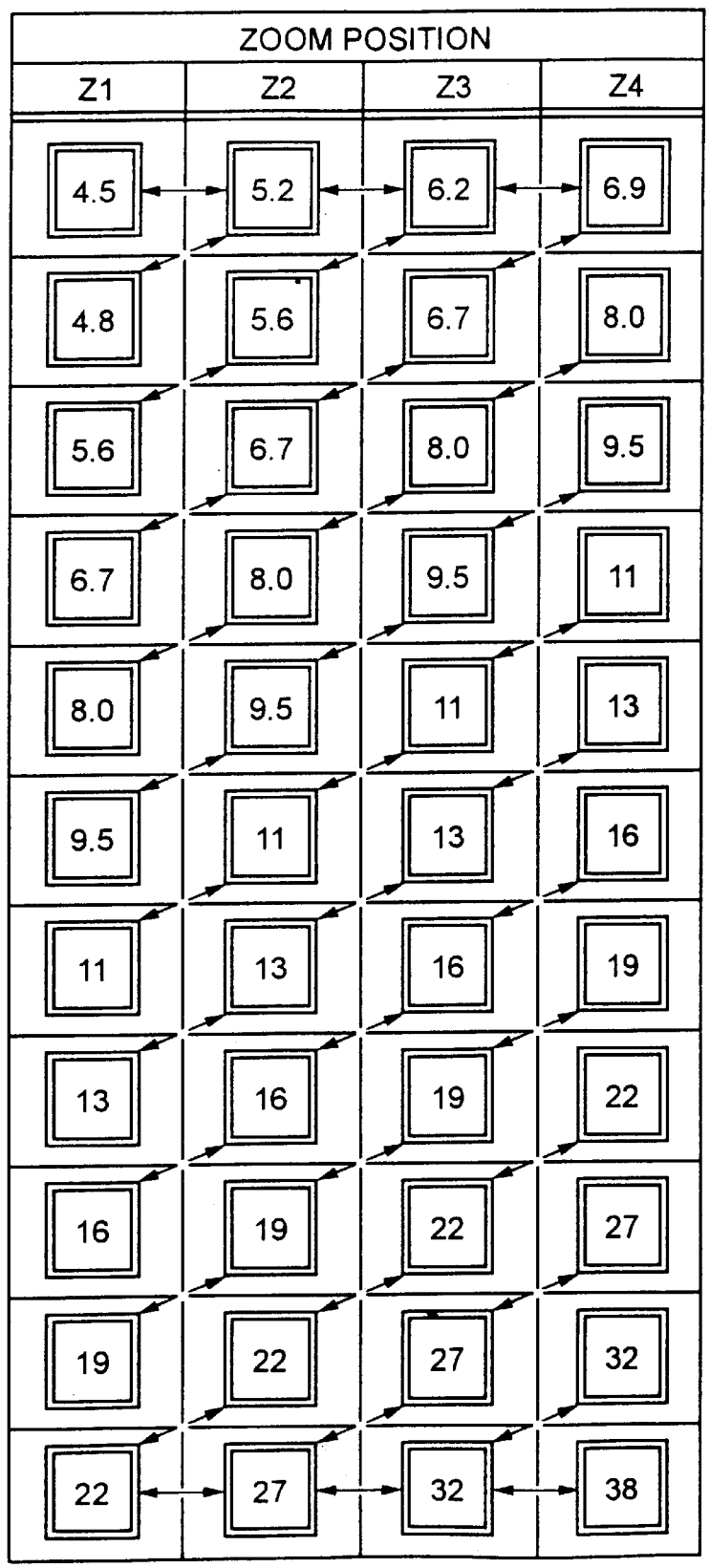
FIG. 32 is a view showing a relationship between zoom positions and F-numbers.

FIG. 32 is a view showing a relationship between zoom positions and aperture scales or F-numbers.

In FIG. 32, a zoom position Z1 denotes the nearest zoom position (wide end) to the wide side, and as the position goes to zoom positions Z2, Z3, the zoom positions Z2, Z3 shift to the telephoto side. A zoom position Z4 denotes the nearest zoom position (telephoto end) to the telephoto side.

According to the present embodiment, in the A mode, the As mode (which are the aperture-priority mode, as mentioned above), and the M mode (manual mode), when the zoom position is altered, basically, a constant aperture scale is maintained regardless of the zoom position. For example, in the event that the zoom position Z1 is set and the aperture scale is 8.0, the mechanical aperture diameter of the aperture blades at the time of the photograph is controlled so that the aperture scale is maintained to be 8.0, even if the zoom position is altered to anyone of Z2, Z3, and Z4.

When the aperture blades are of the maximum aperture diameter, or of the minimum aperture diameter settable, the further control is impossible for the aperture blades. Thus, the aperture scale is altered. For example, when the zoom position Z1 is set and the aperture scale is set to 4.8 and displayed, if the zoom position is altered to Z2, Z3 and Z4, the set and display of the aperture scale is altered to 5.2, 6.2, and 6.9, respectively. When the zoom position Z4 is set and the aperture scale is set to 32 and displayed, if the zoom position is altered to Z3, Z2 and Z1, the set and display of the aperture scale is altered to 32, 27, and 22, respectively.

In steps as to the computing and display for the aperture scale in the steps F__5 and F__6 in FIG. 29 and the steps H__5 and H__6 in FIG. 31, the aperture scale is computed and displayed in the manner as mentioned above.

Next, when the shutter button 34 is depressed, the process goes to step A__9 in which the shutter processing is performed.

Figure 33:
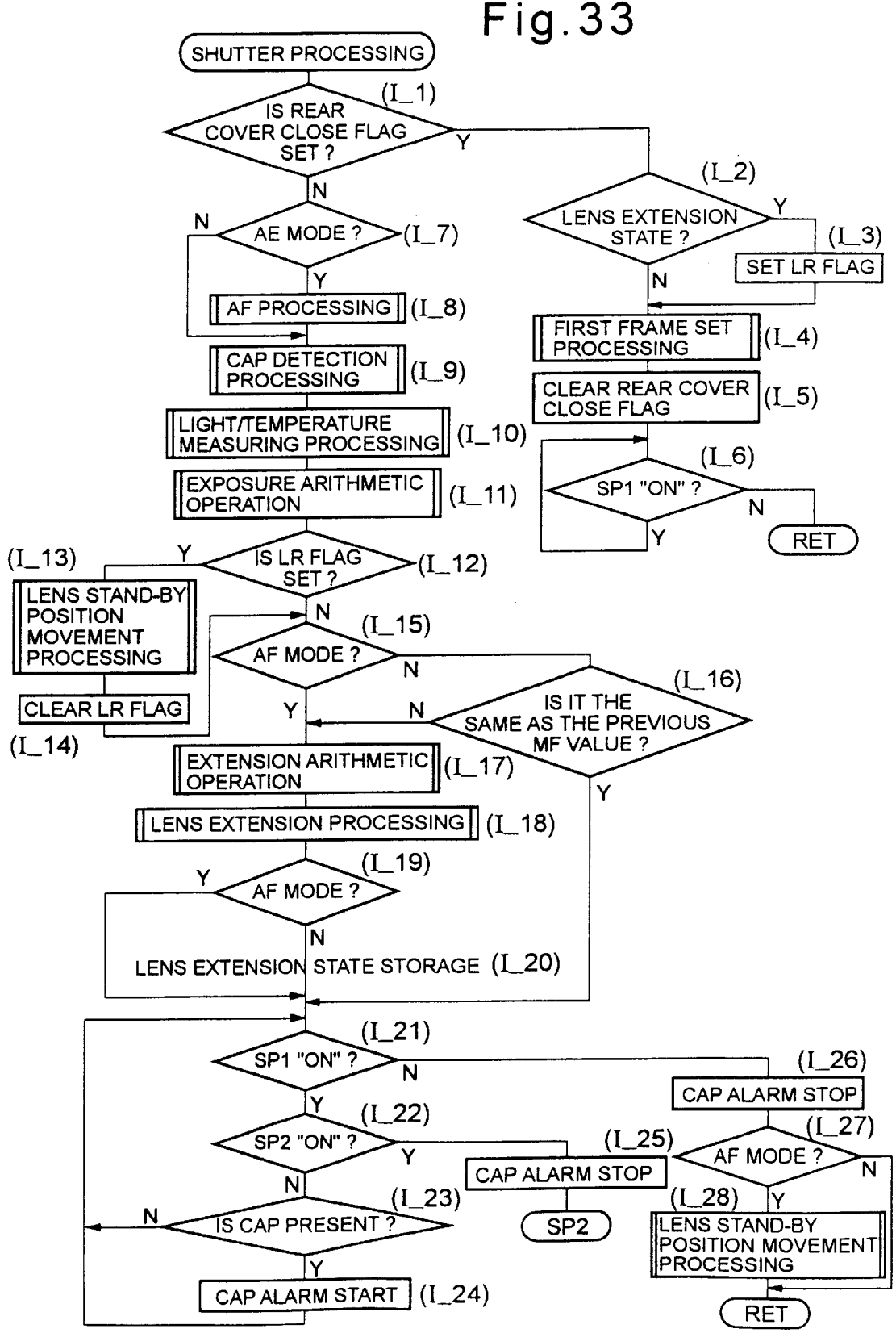
FIG. 33 is a flowchart useful for understanding a shutter processing routine.

FIG. 33 is a flowchart useful for understanding a shutter processing routine.

In the shutter processing routine shown in FIG. 33, first, in step I_1, it is determined whether the rear cover close flag is set.

With respect to the step A_6 in FIG. 24, it is explained that there are two ways of timing in which the first frame set processing is performed, one of which is a timing in which in the state that the select dial 36 shown in FIG. 2 is set to any one of P, A, As, and M, a film is mounted and the rear cover is closed, and thereafter the shutter button 34 is pushed first. In the step I_1 shown in FIG. 33, it is determined whether there is a need to perform the first frame set processing in this timing.

In the step I_1, when it is determined that the rear cover close flag is set, the process goes to step I_2 for the purpose of performing the first frame set processing. In the step I_2, it is determined whether the lens (photographic lens front elements section 910) is extended. With respect to a case where it is decided that the lens is in condition for extension, the explanation has been made with reference to the steps E_2 and G_2 in FIG. 28 and FIG. 30. Thus, redundant explanation will be omitted.

In the step I_2, it is decided that the lens is extended, the process goes to steps E_3 in which an LR flag indicative of the matter that the lens is in condition for extension is set.

In step I_4, the first frame set processing is performed. In step I_5, the rear cover close flag is cleared. In step I_6, when the shutter button is released (the SP1 switch for detecting the half-depression of the shutter button turns off), this routine is passed through.

In step I_1, when it is decided that the rear cover close flag is cleared, it means that the first frame set processing has been completed, or the several frames of film have been exposed, and thus the process goes to step I_7 in which it is determined whether the operation mode is the AF (auto focus) mode or the MF (manual mode). When the AF mode is selected, an AF processing is performed (step I_8). In the AF processing, the distance to the camera subject is measured.

In step I_9, there is performed a cap detection processing in which it is detected whether the lens cap is mounted.

Figure 34:
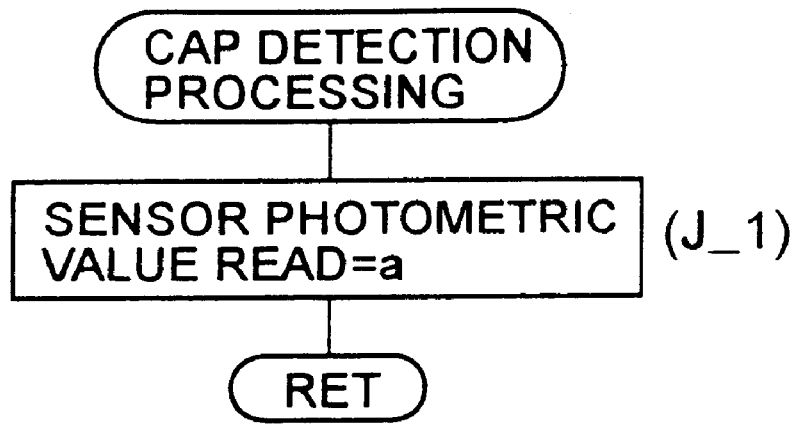
FIG. 34 is a flowchart useful for understanding a cap detection processing routine.

FIG. 34 is a flowchart useful for understanding a cap detection processing routine.

In the cap detection processing routine, a photometric value of the cap sensor provided in the lens barrel is simply read (step J_1). An actual cap detection is carried out later. Where the photometric value thus read is given by a.

In step I_10 of the shutter processing routine shown in FIG. 33, a light measuring and temperature measuring processing is performed.

Figure 35:
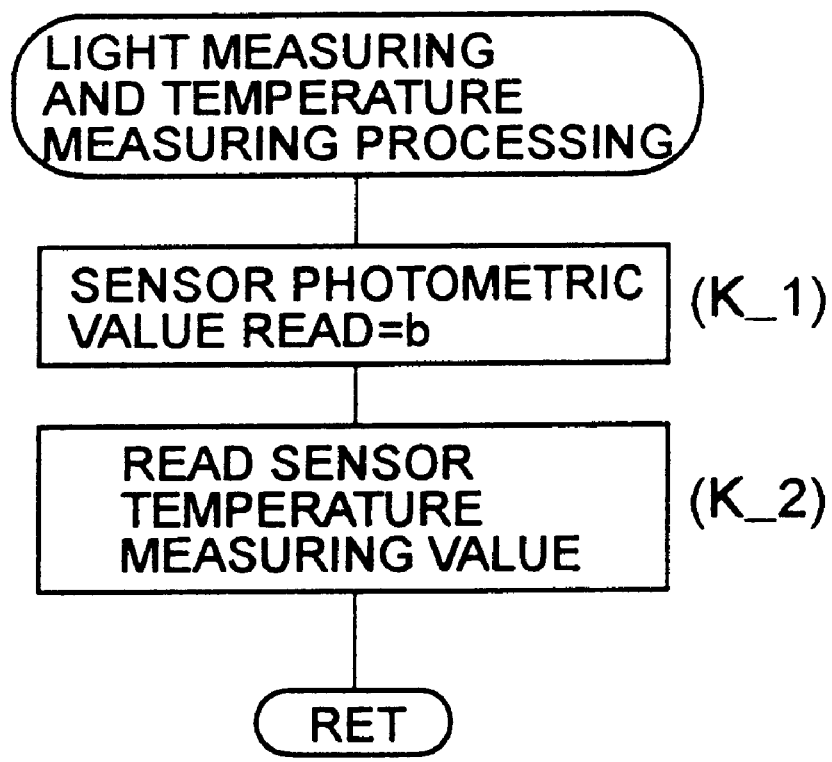
FIG. 35 is a flowchart useful for understanding a light measuring and temperature measuring processing routine.

FIG. 35 is a flowchart useful for understanding a light measuring and temperature measuring processing routine.

Here, a photometric value by the AE sensor disposed within the AE window 324 shown in FIG. 1 (step K_1) is read. Where the photometric value thus read is given by b. In step K_2, a temperature measured value by the temperature measuring sensor disposed in one united body with AE sensor within the AE window 324 is read. This temperature measured value is used for correction of the focusing value measured by the AF sensor, as mentioned above.

In step I_11 for the shutter processing routine shown in FIG. 33, an exposure arithmetic operation is performed in accordance with the photometric value by the AE sensor, which is obtained in step I_10. In the P mode (program mode), the aperture and the shutter speed are determined in accordance with a predetermined program diagram. In the A mode or the As mode, the shutter speed suitable for the set aperture scale is determined.

In step I_12, it is determined whether the LR flag is set. This LR flag is one which is set in step I_3 when it is decided in step I_2 that the lens is in condition for extension.

In step I_12, when it is decided that the LR flag is set, the process goes to step I_13 in which the lens (the photographic lens front elements section 910) is once returned to the storage position. In step I_14, the LR flag is cleared.

In step I_15, it is determined whether the AF mode is set. When it is decided that the AF mode is not set, in other words, the MF (manual focus) mode is set, the process goes to step I_16 in which it is determined whether the same MF-number (the same camera-to-subject distance) as that involved in the previous photograph is set. At that time, when the first frame of photograph is concerned, it is decided that the same MF-number as the previous MF-number is not set.

When it is decided that the same MF-number as the previous photograph is not set, or when it is decided that the AF mode is set in the step I_15, the process goes to step I_17 in which an arithmetic operation for the amount of lens extension is effected.

Figures 37, 38, 39:
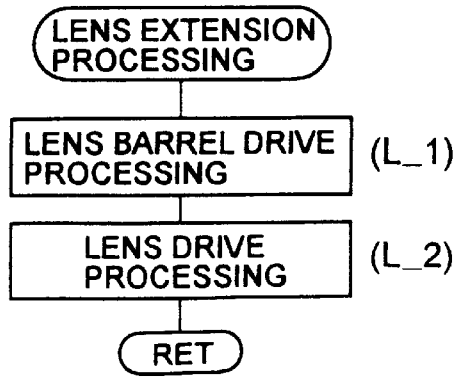
FIG. 37 is a view showing correction data of an amount of lens extension in case of the use of 220 film.
FIG. 38 is a view showing apart of a table showing the association between a set up photographic distance or a camera-to-subject distance and a value (1/L) to be used in arithmetic operation for an amount of lens extension, in the MF mode.
FIG. 39 is a flowchart useful for understanding a lens extension processing routine.

FIG. 36 is a view showing a part of a table showing the association between a photographic distance or a camera-to-subject distance and an amount of lens extension. FIG. 37 is a view showing correction data of the amount of lens extension in case of the use of 220 film. FIG. 38 is a view showing apart of a table showing the association between a set up photographic distance or a camera-to-subject distance and a value (1/L) to be used in arithmetic operation for the amount of lens extension, in the MF mode. These tables and data are recorded in the control circuit shown in FIG. 23.

In the AF mode, a reciprocal number of the photographic distance L obtained by the AF processing in the step I_8 (FIG. 38) is expressed by 1/L. In case of the MF mode, the set distance is converted into 1/L. Providing that 1/L thus obtained is for example, '100', since no value corresponding to '100' appears in 1/L in the table shown in FIG. 36, two values of 1/L sandwiching the '100', that is, columns of '102' and '56' are referred to. Assuming that the present zoom position is Z1, the extension count number for 1/L= 100 is determined by the proportional calculation using extension count numbers '493', '455' of the zoom position= Z1 in case of 1/L: '102', '56'.

That is, in case of this example, the extension count number corresponding to (1/L=100), that is, $$455+(493-455)\times\{(100-56)/(102-56)\}\approx 491$$

is obtained. In order to extend the photographic lens front elements section 910 from the stand-by position, the photographic lens front elements section 910 is extended by the amount of extension corresponding to the extension count number thus obtained. It is noted that the extension count number obtained in the above-mentioned manner is involved in a case where the 120 film is mounted, and the photographic film surface is slightly different between the 120 film and the 220 film. For this reason, according to the present embodiment, in accordance with a signal from the film pressure plate switching detection sensor shown in FIG. 23 (that is, the sensor for detecting projection and sink of the film pressure plate switching pin 64 shown in FIG. 9), there is provided such a control that when the film pressure plate position associated with the 120 film is concerned, the above-mentioned way is maintained as it is, and when the film pressure plate position associated with the 220 film is concerned, the correction data for 220 film shown in FIG. 37 is added to the extension count number obtained in the manner as mentioned above (since FIG. 37 shows minus data, the subtraction is carried out). That is, according to the present embodiment, the correction data '−3' of the zoom position=z1 is added to '491', namely, 491−3=488, is obtained. Thus, when the 220 film is used, the photographic lens front elements section 910 is extended by the amount of extension corresponding to the extension count number '488'.

In this manner, even if the same camera-to-subject distance and the same zoom position are set, the amount of lens extension is altered in accordance with the type of films used. This feature makes it possible to implement focusing with great accuracy for any type of film.

In the step I_17 for the shutter processing routine shown in FIG. 33, when the arithmetic operation for the lens extension has been performed in the manner as mentioned above, the process goes to step I_18 in which the lens extension processing for actually extending the lens is effected.

FIG. 39 is a flowchart useful for understanding a lens extension processing routine.

In this lens extension processing routine, the lens barrel driving processing (step L_1) and the lens driving processing (step L_2) are executed. In the lens driving processing, the photographic lens front elements section 910 located at the lens stand-by position is extended by the amount of extension associated with the extension count number obtained by the arithmetic operation which is explained with reference to FIGS. 36 to 38.

Hereinafter, there will be explained the lens barrel driving processing in the step L_1.

Figure 40:
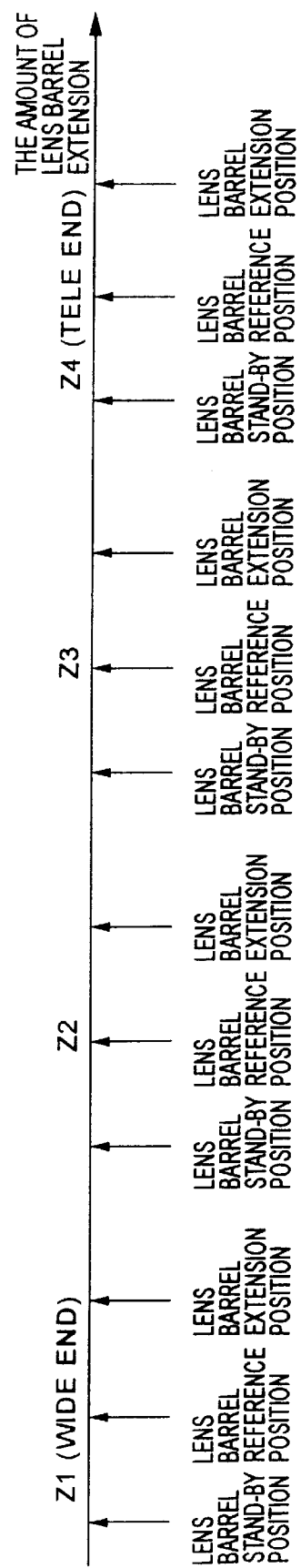
FIG. 40 is an explanatory view for a lens barrel drive processing.

FIG. 40 is an explanatory view for the lens barrel drive processing.

On each of the zoom positions Z1, Z2, Z3 and Z4, there exists a "lens barrel reference position" at slightly WIDE side more than a "lens barrel extension position" concerned with the actual photographic operation. The "lens barrel reference position" can be identified by the encoder shown in FIG. 23, that is, the effect of the encode plate 23c and the encode contact segment 25 shown in FIG. 22. Further, on each of the zoom positions Z1, Z2, Z3 and Z4, there exists a "lens barrel stand-by position" at further WIDE side than the "lens barrel reference position". When the WIDE/TELE switch is operated to alter the zoom position in accordance with the TELE processing and the WIDE processing shown in FIG. 28 and FIG. 30, the lens barrel is extended to the "lens barrel stand-by position" associated with the zoom position after changed.

At the time point of the actual photograph when the shutter button is depressed, in the step L_1 of the lens extension processing routine shown in FIG. 39, the lens barrel is extended from the lens barrel stand-by position on the set zoom position (for example, Z1), and when the lens barrel reaches the lens barrel reference position on the zoom position (=Z1), it is detected by the encoder, and thereafter the lens barrel is further extended by a predetermined count number corresponding to a distance between the lens barrel reference position and the lens barrel extension position and stops at the lens barrel extension position associated with the zoom position.

Thereafter, as mentioned above, in the step L_2 the photographic lens front elements section is extended.

As described above, according to the present embodiment, the lens barrel is placed at the lens barrel stand-by position, and when the photographic operation is conducted, the lens barrel is extended always from the same direction. This feature makes it possible to suppress unevenness in extension of the lens barrel due to the back-lash of the lens barrel drive bear and the like. Likely, with respect to the photographic lens front elements section, since it is extended always from the lens stand-by position, it is possible to suppress unevenness in extension of the lens due to the back-lash of the lens drive bear and the like. Thus, according to the present embodiment, both the lend barrel and the lens itself are subjected to a so-called set up drive starting from the stand-by position, and thereby implementing a focusing performance with great accuracy.

In step I_19 for the shutter processing shown in FIG. 33, it is determined whether the AF mode is selected. When the AF mode is not selected, in other words, when the MF mode is selected, the process goes to step I_20 in which it is stored that the lens is in the state for extension. Storage of the state of the lens extension is used for determination as to whether the lens is in the state for extension in step I_2 after the film is exchanged.

In step I_21, it is determined whether the SP1 turns on in accordance with depression of the shutter button. When it is decided that the SP1 turns on, the process goes to step I_22 in which it is determined whether the SP2 turns on. When it is decided that the half-depression state (the SP1 turns on, and the SP2 turns off), the process goes to step I_23 in which it is determined whether the lens cap is mounted. A way of determination has been described above. That is, it is as follows.

It is decided that the lens cap is attached when following relations are satisfied, LVa<the photometric value a, and LVb>the second photometric value b where LVa denotes a first threshold to be compared with the first photometric value a by the cap sensor in the lens barrel, and LVb denotes a second threshold to be compared with the second photometric value b by the AE sensor. And it is decided that the lens cap is not attached when the above-noted relations are not satisfied (including a case where it is difficult to decide whether the lens cap is attached because of darkness).

When it is decided that the lens cap is attached, the process goes to step I_24 in which it is alarm-displayed on the finder that the lens cap is attached.

In the step I_22, when it is decided that the SP2 turns on, the process goes to step I_24 in which the cap alarm emanated in the step I_24 is stopped, and the SP2 processing involving the actual shutter operation is executed. The SP2 processing will be described later. According to the present embodiment, in view of the situation that even if the cap sensor and the AE sensor generate the photometric values indicative of the attachment of the lens cap, actually, the lens cap is not attached and a specific photography is conducted, there is provided such an arrangement that the shutter operation is permitted regardless of the cap alarm.

In the step I_21, when it is decided that the SP1 turns off, the process goes to step I_26 in which the cap alarm emanated in the step I_24 is stopped. In the step I_27, it is determined which mode is selected between the AF mode and the MF mode. When the AM mode is selected, the translation processing to the stand-by position for the lens is performed.

Figure 41:
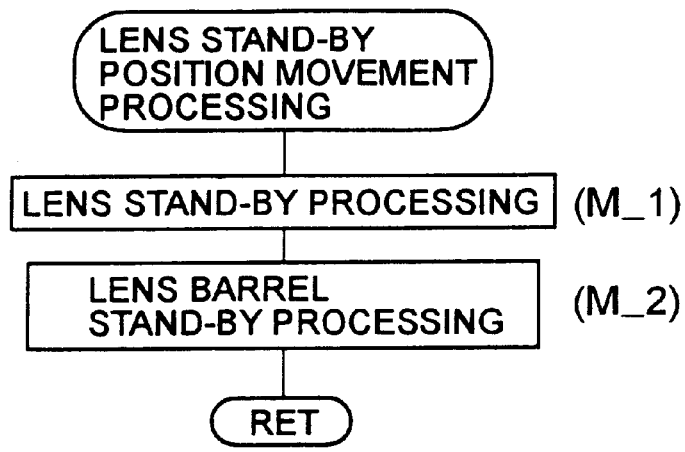
FIG. 41 is a flowchart useful for understanding a lens stand-by position movement processing routine.

FIG. 41 is a flowchart useful for understanding a lens stand-by position movement processing routine.

Here, both the lens stand-by processing (step M_1) and the lens barrel stand-by processing (step M_2) are executed.

In the lens stand-by processing (step M_1), the photographic lens front elements section 910, which is extended in the step L_2 in the lens extension processing routine shown in FIG. 39, is returned to the original lens stand-by position. In the lens barrel stand-by processing (step M_2), the lens barrel, which is extended in the step L_1 in the lens extension processing routine shown in FIG. 39, is returned to the lens barrel stand-by position on the zoom position now set up (for example, Z1). As mentioned above, with respect to the amount of extension for the lens barrel in the photography, since the lens barrel reference position is selected as the base, it is permitted that the lens barrel stand-by position is large in the error.

According to the shutter processing routine shown in FIG. 33, in the event that the final frame of photography is completed in the state of lens extension in the MF (manual focus) mode and the rear cover is opened to exchange the film (for example, the 120 film) used for the last photography to a different type film (for example, the 220 film), there is a need to readjust the amount of extension for the lens, since the amount of extension for the lens is varied in accordance with a type of films, as mentioned above. According to the present embodiment, in order to satisfy this requirement, in the event that the shutter button is depressed in the state of lens extension to perform the first frame set processing, the lens is once returned to the stand-by position at the time point of SP1 turn-on at the time when after the completion of the first frame set processing the shutter button is subsequently depressed (step I_13), the film pressure position is detected by a signal generated from the film pressure plate switching detection sensor shown in FIG. 23, and the lens is re-extended to the position associated with the detected film pressure position. It is acceptable, however, that the timing of returning the lens to the stand-by position is the time point when the rear cover is opened, or when the rear cover is closed, and the re-extension of the lens is performed after completion of the first frame set processing, before the subsequent depression of the shutter button.

Figure 42:
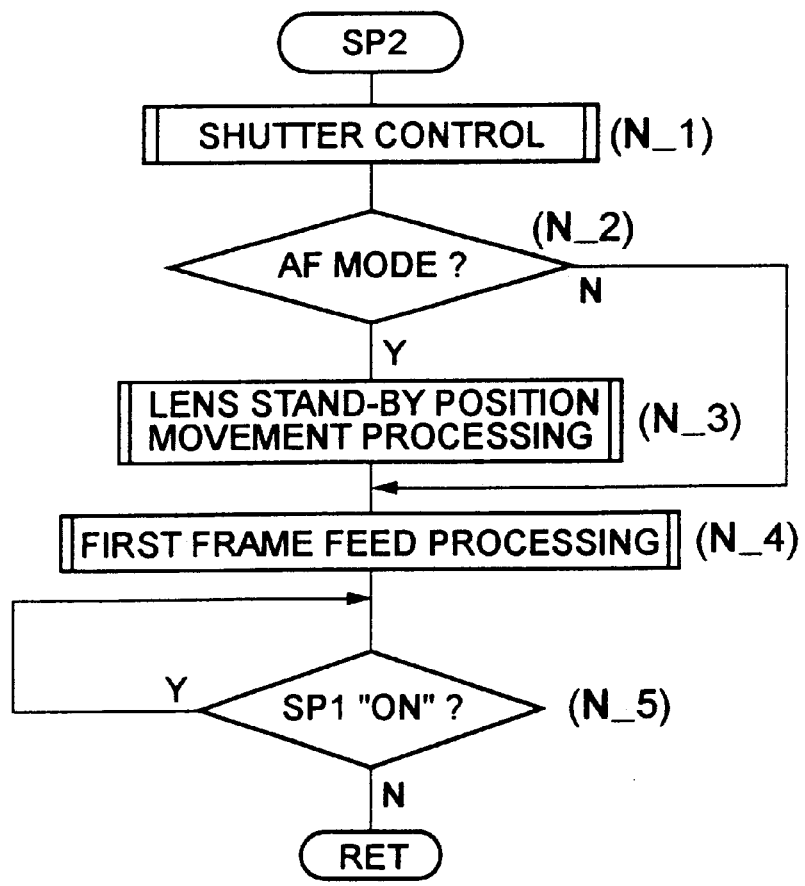
FIG. 42 is a flowchart useful for understanding a SP 2 processing routine to be executed in a shutter button entire depression.

FIG. 42 is a flowchart useful for understanding a SP 2 processing routine to be executed in a shutter button entire depression.

In the SP 2 processing, first, in step N_1, the shutter control routine is executed.

Figure 43:
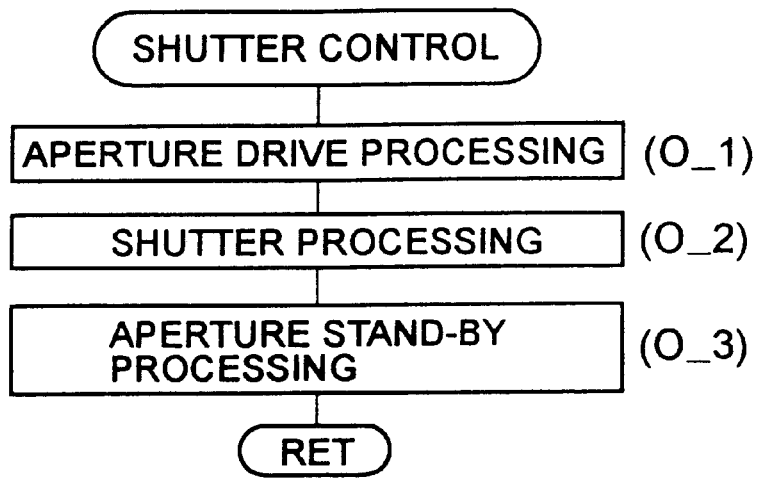
FIG. 43 is a flowchart useful for understanding a shutter control routine.

FIG. 43 is a flowchart useful for understanding the shutter control routine.

In step O_1, the aperture drive processing is performed. Here, in the P mode, the aperture blades 921 are adjusted to an aperture opening diameter (F-number) determined in accordance with a photometric value obtained by the AE sensor, a predetermined program diagram and a zoom position now set up. In any one of the A mode, the As mode and the M mode, the aperture blades 921 are adjusted to an aperture opening diameter determined in accordance with an aperture scale manually set up and a zoom position now set up. According to the present embodiment, in the stand-by state, the aperture opening diameter offers an intermediate opening diameter. This feature makes it possible to drive the aperture blades to a desired aperture opening diameter at high speed.

In step O_2, the shutter processing is performed. In this shutter processing, in the P mode, in a similar fashion to that of the above-mentioned aperture opening diameter, the sector blade 922 is switched at a shutter speed determined in accordance with a photometric value obtained by the AE sensor, a predetermined program diagram and a zoom position now set up. In the A mode or the As mode, the sector blade 922 is switched at a shutter speed associated with a photometric value obtained by the AE sensor, a zoom position now set up and an aperture scale manually set up. In the M mode, the sector blade 922 is switched at a shutter speed manually set up.

In step O_3, the aperture stand-by processing is performed. In this aperture stand-by processing, the aperture blades 921 are returned to the intermediate opening diameter.

When the above-mentioned shutter control processing is carried out, the process goes to step N_2 in the SP2 processing routine shown in FIG. 42 in which it is determined whether the AF mode is set up. When it is decided that the AF mode is set up, the process goes to step N_3 in which the lens stand-by position movement processing is performed. This lens stand-by position movement processing has been explained with reference to FIG. 41. Thus redundant description will be omitted.

In step N_4, the first frame feed processing is performed in which the mounted film is wound up by one frame correspondence.

In step N_5, the SP2 processing routine is passed through when the SP1 turns off.

Figure 44:
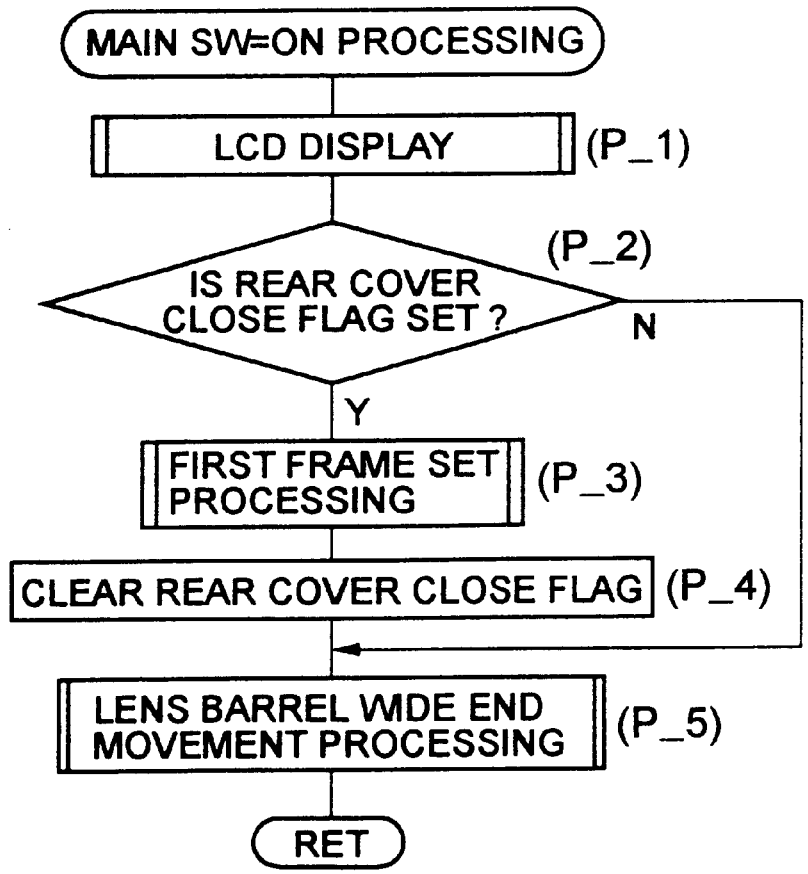
FIG. 44 is a flowchart useful for understanding a main switch turn on processing routine.

FIG. 44 is a flowchart useful for understanding a main switch turn on processing routine.

This routine is executed when the select dial 36 turns from 'OFF' to any one of 'P', 'A', 'As' and 'M'.

In this routine, first, in step P_1, the LCD display is initiated, and then it is determined whether the rear cover close flag is set.

In connection with the explanation of the step A_6 in FIG. 24, it has been explained that there are two ways in timing of performing the film first frame processing, and one of the two ways is associated with timing in which the shutter button is first depressed (cf. Step I_4 in FIG. 33). Another is associated with timing in which in the event that the first frame is not yet set, the select dial 36 turns from 'OFF' to any one of 'P', 'A', 'As' and 'M'. Determination as to whether the rear cover close flag is set in step P_2 in FIG. 44 is to determine whether the first frame is already set. In step P_2, when it is decided that the rear cover close flag is set in step P_2, the process goes to step P_3 in which the first frame set processing is performed. In step P_4, the rear cover flag is cleared.

In step p_5, the lens barrel in the state that it sinks is translated to the lens barrel stand-by position of the WIDE end (zoom position=Z1).

Figure 45:
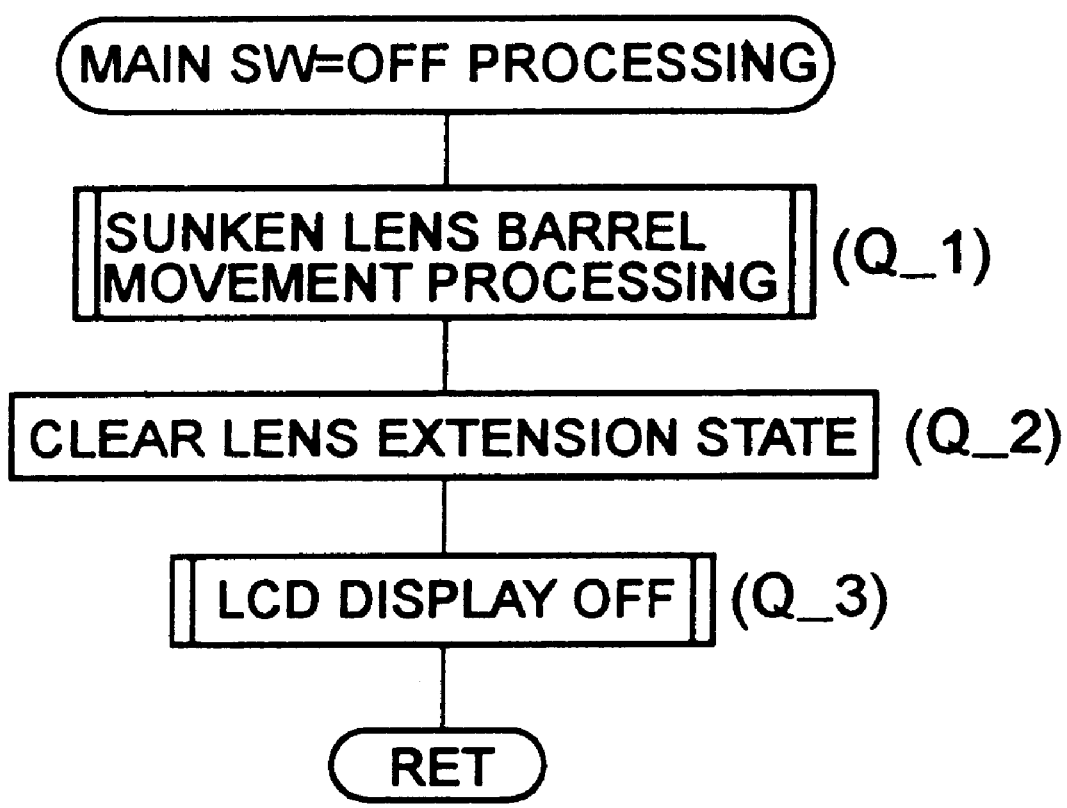
FIG. 45 is a flowchart useful for understanding a man switch turn off processing routine.

FIG. 45 is a flowchart useful for understanding a man switch turn off processing routine.

This routine is executed when the select dial 36 turns from 'P', 'A', 'As' and 'M' to 'OFF'.

In this routine, in step Q_1 the lens barrel is translated to be the barrel sinking state, and in addition when the lens is in the state of extension, the lens is also translated to the stand-by position. Then, the process goes to step Q_2 in which the flag indicative of the lens extension state is cleared. This flag is set in the step I_20 in the shutter processing routine shown in FIG. 33 to be used for a decision in the step I_2. In step Q_3, the LCD display turns off.

As described above, according to the present invention, it is possible to detect with great accuracy whether the lens cap is mounted, with a standard type lens cap.

While the present invention has been described with reference to the particular embodiments, it is not to be restricted by the those embodiments. It is to be appreciated that those skilled in the art can modify the embodiments without departing from the scope and spirit of the present invention.

We claim:

1. A camera comprising:

a lens barrel incorporating a photographic lens, on which a lens cap for covering a front of the photographic lens is detachably mounted, said lens barrel having a first sensor for photometry at a position outside of the photographic lens;

a second sensor for exposure control provided on a camera main frame independent of said lens barrel; and a determining unit for determining whether the lens cap is mounted on said lens barrel in accordance with a first photometric value by said first sensor and a second photometric value by said second sensor, wherein said lens barrel has a filter ring having an outer wall on which the lens cap is detachably mounted and an inner wall on which a photographic filter is detachably mounted, and said lens barrel has said first sensor at a position inside said filter ring and outside the photographic lens.

2. A camera comprising:

a lens barrel incorporating a photographic lens, on which a lens cap for covering a front of the photographic lens is detachably mounted, said lens barrel having a first sensor for photometry at a position outside of the photographic lens;

a second sensor for exposure control provided on a camera main frame independent of said lens barrel; and a determining unit for determining whether the lens cap is mounted on said lens barrel in accordance with a first photometric value by said first sensor and a second photometric value by said second sensor, wherein said lens barrel incorporates therein a shutter having a sector and a shutter drive unit for driving said sector;

the camera main frame has a shutter control unit for outputting a shutter drive control signal to said shutter drive unit; and said camera has a flexible substrate for electrically connecting said shutter control unit to said shutter drive unit and for transmitting the first photometric value by said first sensor to said determining unit.

3. A camera according to claim 1, wherein said determining unit determines an attachment of the lens cap when following relations are satisfied, $$LVa < \text{the photometric value, and } LVb > \text{the second photometric value}$$

where LVa denotes a first threshold to be compared with the first photometric value by said first sensor, and LVb denotes a second threshold to be compared with the second photometric value by said second sensor (assuming that Lva<LVb).

4. A camera according to claim 2, wherein said determining unit determines an attachment of the lens cap when following relations are satisfied, $$Lva < \text{the photometric value, and } LVb > \text{the second photometric value}$$

where Lva denotes a first threshold to be compared with the first photometric value by said first sensor, and LVb denotes a second threshold to be compared with the second photometric value by said second sensor (assuming that Lva<LVb).

* * * * *